United States Patent
Kitagawa et al.

[11] Patent Number: 6,017,604
[45] Date of Patent: Jan. 25, 2000

[54] OPTICAL RECORDING MEDIUM

[75] Inventors: Sumiko Kitagawa, Saitama; Masahiro Shinkai, Chiba; Kenryo Namba, Tokyo, all of Japan

[73] Assignee: TDK Corporation, Tokyo, Japan

[21] Appl. No.: 08/696,570

[22] Filed: Aug. 16, 1996

Related U.S. Application Data

[62] Division of application No. 08/413,879, Mar. 30, 1995, Pat. No. 5,569,504.

[30] Foreign Application Priority Data

Mar. 31, 1994 [JP] Japan ............................ 6-87860
Mar. 9, 1995 [JP] Japan ............................ 7-78097

[51] Int. Cl.$^7$ .................................................. B32B 3/00
[52] U.S. Cl. ..................... 428/64.1; 428/64.4; 428/64.8; 428/913; 430/270.15; 430/495.1; 430/945
[58] Field of Search ................. 428/64.1, 64.2, 428/64.4, 64.8, 913; 430/270.1, 270.11, 270.14, 270.15, 495.1, 945; 369/283, 288

[56] References Cited

FOREIGN PATENT DOCUMENTS

| | | |
|---|---|---|
| 4310917 | 10/1993 | Germany . |
| 61-197280A | 2/1985 | Japan . |
| 3-62878A | 12/1989 | Japan . |
| 3-215466A | 6/1990 | Japan . |
| 5-1272A | 4/1991 | Japan . |
| 4-226390A | 6/1991 | Japan . |
| 5-25179A | 7/1991 | Japan . |
| 5-86301A | 9/1991 | Japan . |
| 05222302 | of 1994 | Japan . |
| 06251417 | of 1994 | Japan . |
| 7-32737 | 2/1995 | Japan . |

OTHER PUBLICATIONS

European Search Report; Jul. 10, 1995.
Nikkei Electronics; Jan. 23, 1989 (No. 465).
The Functional Dye Department of the Kinki Chemical Society; Mar. 3, 1989.
SPIE vol. 1078; Optical Recording Topical Meeting (1989).

*Primary Examiner*—Elizabeth Evans
*Attorney, Agent, or Firm*—Laubscher & Laubscher; R J. Lasker

[57] ABSTRACT

A phthalocyanine dye of specific structure represented by the following general formula (1) or (2):

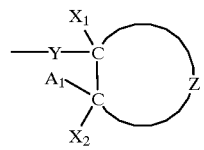

where Y is O or S attached to the phthalocyanine ring, Z is the group of atoms required to complete a carbon or heterocyclic ring together with C, $A_1$ is a monovalent substituent bulkier than a hydrogen atom, and each of $X_1$ and $X_2$ is H or a monovalent substituent or, in the alternative, $X_1$ and $X_2$, taken together, form a single bond,

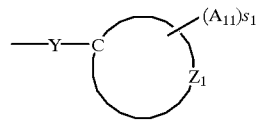

where Y and $Z_1$ have the same meanings as defined for Y and Z in formula (1). $A_{11}$ is a monovalent substituent having a branched alkyl group, which is attached to the ring completed by $Z_1$, and s1 is the number of $A_{11}$, is used for the recording layer of an optical recording layer. This phthalocyanine dye is unlikely to attack a substrate material such as PC, can be handled with ease, and has a high solubility in a coating solvent advantageous for film formation, for instance, an alcoholic solvent, e.g., ethyl cellosolve or an aliphatic hydrocarbon solvent.

39 Claims, 3 Drawing Sheets

OPTICAL RECORDING MEDIUM

This application is a divisional application of application Ser. No. 08/413,879, filed Mar. 30, 1995 now U.S. Pat. No. 5,569,504 issued Oct. 24, 1996.

BACKGROUND OF THE INVENTION

1. Field of the Invention

The present invention relates to an optical recording disk having a dye film as a recording layer and, more particularly, to a write-once type of optical recording disk using a phthalocyanine dye.

2. Prior Art

In recent years, optical recording disks of the write-once, rewritable (erasable) and other types have been of great interest as high capacity information carrying media. Some optical recording disks use a dye film as their recording layer. From a structural aspect, commonly used optical recording disks are classified into an air-sandwich structure type having an air space on a dye base recording layer and a close contact type having a reflective layer in close contact with a dye base recording layer. The latter has the advantage of enabling reproduction in accordance with the compact disk (CD) standard. For instance, reference is made to Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pp. 80–87, "Optical Data Storage Topical Meeting", Jan. 17–19, 1989, Los Angels.

Usually, the above-mentioned recording layer is formed by the coating of a dye coating solution on the substrate.

So far, cyanine dyes have mainly been studied as dyes used for recording layers. However, the cyanine dyes are generally less resistant to light, and is little reliable on recording when applied to recording layers. An attempt has thus been made at use of phthalocyanine dyes excellent in stability to light, heat, humidity and the like.

However, the phthalocyanine dyes are generally less soluble in organic solvents. When a recording layer is formed by use of a dye coating solution, therefore, it is difficult to prepare such a dye coating solution and, hence, to form a dye film of effective thickness.

It has thus been attempted to introduce substituents in the phthalocyanine dyes for solubilization.

For instance, JP-B 3-16916 discloses a phthalocyanine compound with five to sixteen alkoxy or aryloxy groups introduced therein as substituents and JP-A 5-25179 discloses a halogenated alkoxyphthalocyanine.

JP-B 3-16916 also teaches that toluene and the like are used as coating solvents. However, it is not preferable to use such aromatic hydrocarbon solvents, because they attack polycarbonate (PC) that is a commonly used substrate material.

On the other hand, the halogenated alkoxyphthalocyanine disclosed in JP-A 5-25179 is prepared through the steps of synthesizing alkoxyphthalocyanine and then halogenating it. A specific reaction solvent must be selected for the halogenation, and the amount of solvent, the reaction temperature and other parameters must be controlled as well. In other words, this compound is difficult to synthesis and low in yield.

It is thus desired to use a phthalocyanine dye which can be synthesized in a relatively ready manner and is well soluble in a solvent that is unlikely to attack a substrate material such as PC and is handled with ease, for instance, an alcoholic or aliphatic hydrocarbon type of organic solvent.

A primary object of this invention is to provide an optical recording medium including a recording layer of sufficient thickness and good-enough quality, which has been formed by use of a phthalocyanine dye that can be synthesized in a relatively ready manner, can be well handled because of being unlikely to attack a substrate material, and is well soluble in a coating solvent. This optical recording medium is so stable in performance that it can comply with the CD standard.

SUMMARY OF THE INVENTION

According to one aspect of this invention, the object mentioned above is achieved by the provision of an optical recording medium including a dye-containing recording layer on a substrate, wherein said dye is a phthalocyanine dye having at least one group represented by the following general formula (1):

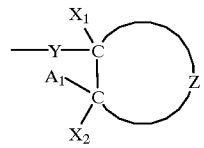

wherein:

Y is an atom attached to the phthalocyanine ring and stands for an oxygen or sulfur atom, Z is the group of atoms required to complete a carbon or heterocyclic ring together with a carbon atom, $A_1$ is a monovalent substituent bulkier than a hydrogen atom, and each of $X_1$ and $X_2$ is a hydrogen atom or a monovalent substituent or, in the alternative, $X_1$ and $X_2$, taken together, form a single bond.

Preferably, the phthalocyanine dye is represented by the following general formula (2):

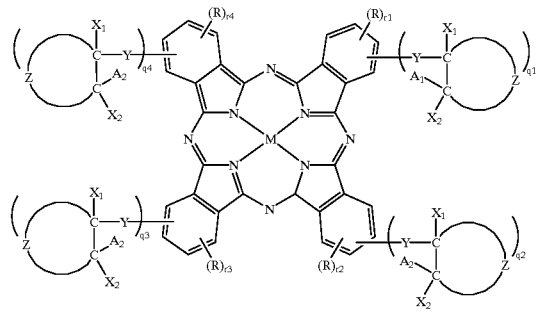

wherein:

M is a center atom of the phthalocyanine ring,

Y is an oxygen or sulfur atom,

Z is the group of atoms required to complete a carbon or heterocyclic ring together with a carbon atom, $A_1$ is a monovalent substituent bulkier than a hydrogen atom, $A_2$ is a hydrogen atom or a monovalent substituent bulkier than a hydrogen atom, each of $X_1$ and $X_2$ is a hydrogen atom or a monovalent substituent or, in the alternative, $X_1$ and $X_2$, taken together, form a single bond, $q_1$ is an integer of 1 to 4, each of $q_2$, $q_3$ and $q_4$ is 0 or an integer of 1 to 4, R is a monovalent substituent, and each of $r_1$, $r_2$, $r_3$ and $r_4$ is 0 or an integer of 1 to 4.

Preferably, the phthalocyanine dye has one to eight groups represented by formula (1) per molecule.

More preferably, the phthalocyanine dye has four groups represented by formula (1) per molecule.

Preferably, the ring completed by Z is an aromatic or aliphatic carbon ring.

More preferably, the carbon ring is a benzene or cyclohexane ring.

Preferably, the phthalocyanine dye is represented by the following general formula (3):

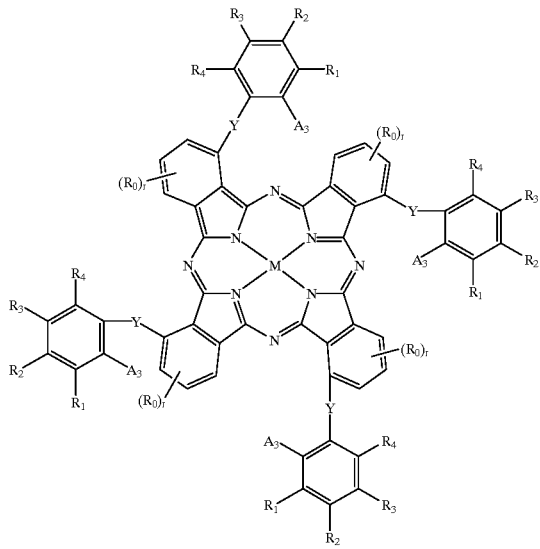

wherein:

M is a center atom of the phthalocyanine ring,

Y is an oxygen or sulfur atom, $A_3$ is a monovalent substituent bulkier than a hydrogen atom, $R_0$ is a monovalent substituent, r is 0 or an integer of 1 to 3, and each of $R_1$, $R_2$, $R_3$ and $R_4$ is a hydrogen atom or a monovalent substituent.

More preferably, at least one of $R_1$, $R_2$, $R_3$ and $R_4$ is a monovalent substituent.

Preferably, the phthalocyanine dye is represented by the following general formula (4):

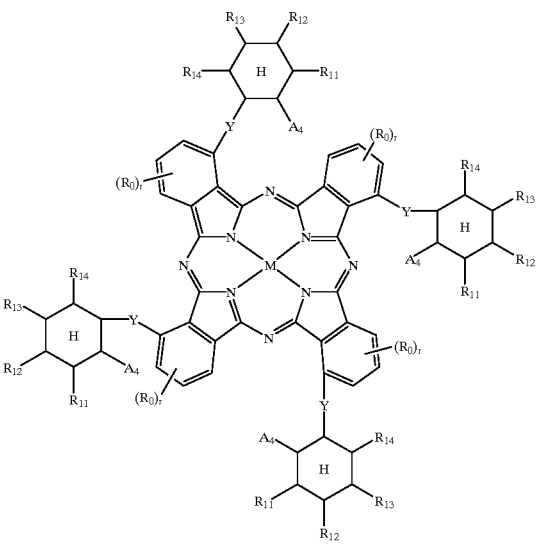

wherein:

M is a center atom of the phthalocyanine ring,

Y is an oxygen or sulfur atom, $A_4$ is a monovalent substituent bulkier than a hydrogen atom, $R_0$ is a monovalent substituent, r is 0 or an integer of 1 to 3, and each of $R_{11}$, $R_{12}$, $R_{13}$ and $R_{14}$ is a hydrogen atom or a monovalent substituent.

More preferably, at least one of $R_{11}$, $R_{12}$, $R_{13}$ and $R_{14}$ is a monovalent substituent.

Preferably, the monovalent substituent bulkier than a hydrogen atom is selected from the group consisting of a halogen atom, and alkyl, aryl, alkoxy, aryloxy, aralkyl, nitro, carboxyl, ester, acyl, amino, amido, carbamoyl, sulfonyl, sulfamoyl, sulfo, sulfino, arylazo, alkylthio and arylthio groups.

More preferably, the monovalent substituent bulkier than a hydrogen atom is selected from the group consisting of alkyl, aryl, alkoxy, aryloxy, aralkyl, ester, arylazo, alkylthio and arylthio groups, or an acyl, amino, amido, carbamoyl, sulfonyl or sulfamoyl group having an alkyl or aryl group.

More preferably, the monovalent substituent bulkier than a hydrogen atom is a branched alkyl or an alkoxy, ester, acyl, amino, amido, carbamoyl, sulfonyl, sulfamoyl or alkylthio group having a branched alkyl group.

Most preferably, the monovalent substituent bulkier than a hydrogen atom is a branched alkyl group.

Preferably, the center atom of the phthalocyanine ring is Cu, Pd or Ni.

Preferably, Y is an oxygen atom.

Preferably, the solubility of the phthalocyanine dye in ethylene glycol monoethyl ether (ethyl cellosolve) is 1% by weight to 10% by weight at 25° C.

Preferably, the recording layer has been formed by the coating of a dye coating solution containing the phthalocyanine dye.

More preferably, a coating solvent for said dye coating solution is an organic solvent having a vapor pressure of up to 10.0 mmHg at 20° C.

Most preferably, the organic solvent is an alcoholic solvent.

Most preferably, the alcoholic solvent is an ethylene glycol monoalkyl ether.

Most preferably, the ethylene glycol monoalkyl ether is ethylene glycol monoethyl ether (ethyl cellosolve).

According to another aspect of this invention, there is provided an optical recording medium including a dye-containing recording layer on a substrate, wherein said dye is a phthalocyanine dye having at least one group represented by the following general formula (5):

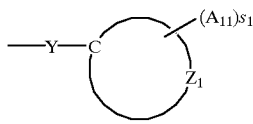

wherein:

Y is an atom attached to the phthalocyanine ring and stands for an oxygen or sulfur atom, $Z_1$ is the group of atoms required to complete a carbon or heterocyclic ring together with a carbon atom, $A_{11}$ is a monovalent substituent having a branched alkyl group, which is attached to the ring completed by $Z_1$, and s1 stands for the number of $A_{11}$, and is an integer of at least 1.

Preferably, the phthalocyanine dye is represented by the following general formula (6):

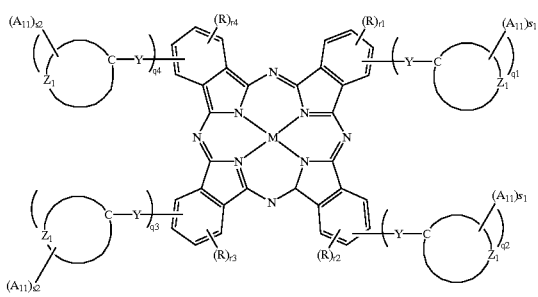

wherein:

M is a center atom of the phthalocyanine ring,

Y is an oxygen or sulfur atom, $Z_1$ is the group of atoms required to complete a carbon or heterocyclic ring together with a carbon atom, $A_{11}$ is a monovalent substituent having a branched alkyl group, which is attached to the ring completed by $Z_1$, each of s1 and s2 represents the number of $A_{11}$ with s1 being an integer of at least 1 and s2 being 0 or an integer of at least 1, q1 is an integer of 1 to 4, each of q2, q3 and q4 is 0 or an integer of 1 to 4, R is a monovalent substituent, and each of r1, r2, r3 and r4 is 0 or an integer of 1 to 4.

Preferably, the phthalocyanine dye has one to eight groups represented by formula (5) per molecule.

More preferably, the phthalocyanine dye has four groups represented by formula (5) per molecule.

Preferably, the ring completed by $Z_1$ is an aromatic or aliphatic carbon ring.

More preferably, the carbon ring is a benzene or cyclohexane ring.

Preferably, the phthalocyanine dye is represented by the following general formula (7):

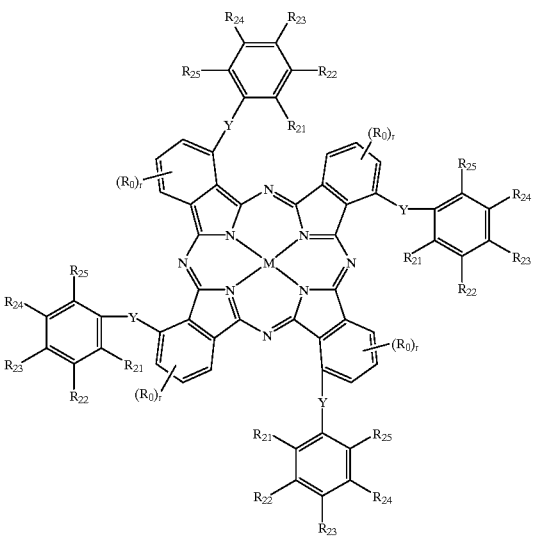

wherein:

M is a center atom of the phthalocyanine ring,

Y is an oxygen or sulfur atom, each of $R_{21}$, $R_{22}$, $R_{23}$, $R_{24}$ and $R_{25}$ is a hydrogen atom or a monovalent substituent with at least one of $R_{21-25}$ being a monovalent substituent having a branched alkyl group, $R_0$ is a monovalent substituent, and r is 0 or an integer of 1 to 3.

More preferably, at least one of $R_{21}$, $R_{22}$, $R_{23}$, $R_{24}$ and $R_{25}$ is a monovalent substituent having a branched alkyl group.

Preferably, the phthalocyanine dye is represented by the following general formula (8):

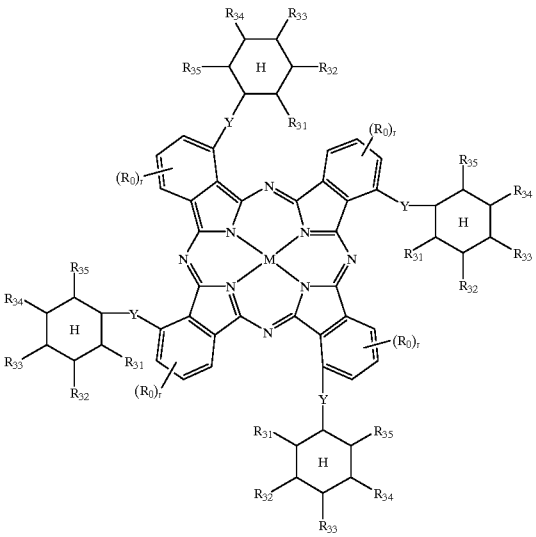

wherein:

M is a center atom of the phthalocyanine ring,

Y is an oxygen or sulfur atom, each of $R_{31}$, $R_{32}$, $R_{33}$, $R_{34}$ and $R_{35}$ is a hydrogen atom or a monovalent substituent with at least one of $R_{31-35}$ being a monovalent substituent having a branched alkyl group, $R_0$ is a monovalent substituent, and r is 0 or an integer of 1 to 3.

Most preferably, at least one of said $R_{31}$, $R_{32}$, $R_{33}$, $R_{34}$ and $R_{35}$ is a monovalent substituent having a branched alkyl group.

Preferably, the monovalent substituent having a branched alkyl group is an alkyl group, an alkoxy group, an alkylthio group or an amino group.

More preferably, the monovalent substituent having a branched alkyl group is an alkyl group.

Preferably, the center atom of the phthalocyanine ring is Cu, Pd or Ni.

Preferably, Y is an oxygen atom.

Preferably, the solubility of the phthalocyanine dye in ethylcyclohexane is 0.5% by weight to 10% by weight at 25° C.

Preferably, the recording layer has been formed by the coating of a dye coating solution containing the phthalocyanine dye.

More preferably, a coating solvent for the dye coating solution is an organic solvent having a vapor pressure of up to 200 mmHg at 20° C.

Most preferably, the organic solvent is an aliphatic hydrocarbon solvent.

The optical recording medium of this invention includes a substrate and a dye-containing recording layer formed thereon. The dye used herein is a phthalocyanine dye having a group represented by formula (1) or (5), more specifically, a phthalocyanine dye represented by formula (2) or (6) which will hereinafter be often called the dye of formula (2) or (6).

As in the case of the dye of formula (2), the phthalocyanine dye having a group of formula (1) contains at least one carbon or heterocyclic ring attached to the phthalocyanine ring via the oxy or thio group, and is of the structure wherein the substitute is introduced at one of sites adjacent to the bond site for Y (the oxy or thio group) in said at least one carbon or heterocyclic ring. That is, the structure with the bulky substituent introduced in the phthalocyanine ring forecloses the possibility of molecular association which is often found in the case of a planar structure. This gives rise to an increase in solubility and, hence, makes it easy to form a dye film when a recording layer is formed by coating. Consequently, a film of sufficient thickness and improved quality can be obtained. Another particular advantage of the phthalocyanine dye of this invention is that an alcoholic solvent (e.g., ethyl cellosolve) which can be handled with ease and is unlikely to attack polycarbonate (PC) that is a commonly used substrate material can be used as the coating solvent.

As in the case of the dye of formula (6), the phthalocyanine dye having a group of formula (5) contains at least one carbon or heterocyclic ring attached to the phthalocyanine ring via the oxy or thio group, and is of the structure wherein the substituent having a branched alkyl group is introduced in such a carbon or heterocyclic ring. In the dye of such a structure, too, molecular association is again avoided, resulting in an increase in solubility, so that the solubility of the dye in an aliphatic hydrocarbon solvent such as ethylcyclohexane can be brought up to a sufficient level. This solvent can thus be used to prepare a dye coating solution and, hence, to form a dye film. Such an aliphatic hydrocarbon solvent does not attack PC as is the case with ethyl cellosolve or the like. Besides, it is so high in vapor pressure that it can evaporate readily. This property makes post-film formation drying easy. Moreover, an optical recording medium obtained with this dye can be protected against an adverse influence of water because of its low affinity for water.

Thus, the phthalocyanine dyes according to this invention can be used for the recording layers of optical recording media conforming to the CD standard.

Particularly preferred among the dyes of formula (2) are those of formulae (3) and (4), and preferred among the dyes of formula (6) are those of formulae (7) and (8). Thus, when the carbon or heterocyclic ring attached to the phthalocyanine ring is a benzene or cyclohexane ring, sufficient storage stability is achieved. In the dyes of formula (2), preferably formula (3) or (4), the monovalent substituent bulkier than a hydrogen atom, especially the substituent having an alkyl or aryl group is introduced at one of sites adjacent to the bond site for Y, so that their solubility can be improved, as already mentioned. Moreover, such dyes, when used to form a recording medium, have the advantage of being capable of improving the reflectivity and C/N of that medium. Some considerable improvement in sensitivity is achieved by the introduction of an additional substituent. In particular, much more improvements in reflectivity and C/N are achieved by the introduction of a lower alkyl or other substituent at another site adjacent to the bond site for Y.

In the dyes of formula (6), preferably formula (7) or (8), the substituent having a branched alkyl group is introduced so that their solubility can be improved, as already mentioned. In particular, some considerably improvements in reflectivity and C/N are achieved by the introduction of the substituent having a branched alkyl group at one of sites adjacent to the bond site for Y, as is the case with the dyes of formulae (3) and (4). Much more improvements in reflectivity and C/N are achieved by the introduction of a lower alkyl or other substituent at another adjacent site.

To achieve high sensitivity, the cyclohexane ring is preferable to the benzene ring, because the former has a low decomposition start temperature. Dyes having at least two Y groups attached to the phthalocyanine ring, that is, dyes wherein the carbon rings attached to the phthalocyanine dye via Y are cyclohexane and benzene rings, and dyes having benzene rings with different combinations of substituents (e.g., compounds V-6 and V-12 to be described later) are preferred because high sensitivity is achieved due to their low melting point.

DETAILED DESCRIPTION OF THE INVENTION

Figure 1:
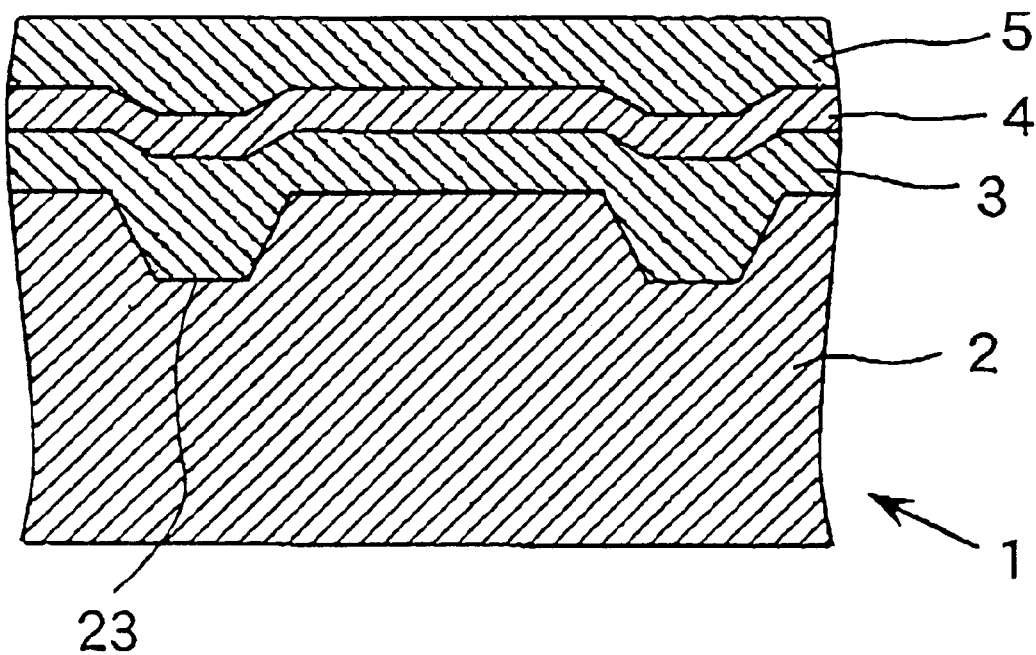
FIG. 1 is a cross-sectional view of part of one embodiment of the optical recording disk according to this invention.

In the ensuing description, this invention will be described at great length.

Among the phthalocyanine dyes used for the recording layer of the optical recording medium according to the invention, the first mention is made of those having a group of formula (1). $A_1$, Y, Z, $X_1$ and $X_2$ in formula (1) will be explained in detail with reference to formula (2), because they have the same meanings as will be mentioned with reference to formula (2).

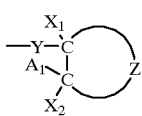
(1)

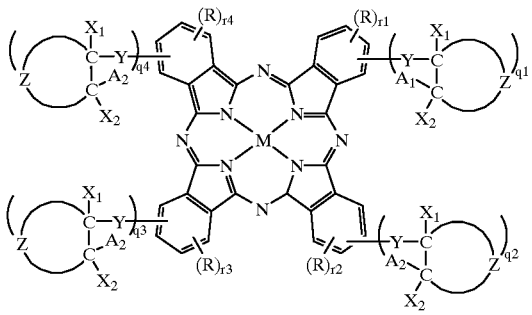
(2)

Referring now to formula (2), M is a center atom. Included in the center atom represented by M are a hydrogen atom (2H) or a metal atom. Examples of the metal atom used herein are those in Groups 1 to 14 of the Periodic Table (Groups 1A to 7A, 8, and 1B to 4B). More specifically, mention is made of Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn and Pb, among which Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Cd, Hg, Al, In, Tl, Si, Ge, Sn and Pb, especially Cu, Pd, Ni, Fe and Co, more especially Cu, Pd and Ni are preferable because of sufficient storage stability.

It is here to be understood that these metal atoms, for instance, V may take the form of VO. Alternatively, the metal atom may have a ligand or ligands such as alcoholate attached to the upper and/or lower sites, as in the case of Si. Metal atoms Cu, Pd, Nd, Fe, Co and VO are preferred because of sufficient storage stability.

Y stands for an oxygen or sulfur atom, with the oxygen atom being most preferred.

Z stands for the group of atoms required to complete a carbon or heterocyclic ring together with a carbon atom (C).

The carbon or heterocyclic ring completed by Z is preferably a five- or six-membered ring which may have a condensed ring. The carbon ring may be either an aliphatic ring or an aromatic ring. Examples of the aliphatic ring are cyclohexane and cyclopentane rings, while examples of the aromatic ring are benzene and naphthalene rings. Preferably, the heterocyclic ring contains a hetero-atom such as oxygen, nitrogen and sulfur, with oxygen and nitrogen being most preferred. For instance, pyridine, furanone, pyrazine, pyrazolidine, piperidinone, quinoxaline, pyranone and thiophenetrion rings are mentioned.

Among these, preference is given to the carbon ring which may be either an aliphatic ring or an aromatic ring. The carbon ring is preferably in a monocyclic form. Particularly preferably examples of the carbon ring are cyclohexane and benzene rings. Preferable examples of the heterocyclic ring are pyridine and 2-furanone rings. The rings completed by Z may be identical with, or different from, each other.

$A_1$ stands for a monovalent substituent bulkier than a hydrogen atom. Examples of the monovalent substituent represented by $A_1$ are halogen atoms, and alkyl, aryl, alkoxy, aryloxy, aralkyl, nitro, carboxyl, ester, acyl, amino, amido, carbamoyl, sulfonyl, sulfamoyl, sulfo, sulfino, arylazo, alkylthio and arylthio groups.

The alkyl group represented by $A_1$ may have a straight or branched chain, and may further have a substituent. The alkyl group has preferably one to twelve, especially two to twelve carbon atoms.

For instance, mention is made of methyl, ethyl, n-propyl, isopropyl n-butyl, isobutyl, sec-butyl, tert-butyl, n-pentyl, isopentyl, neopentyl, tert-pentyl, 1,2-dimethylpropyl n-hexyl, 1,3-dimethylbutyl, 1-iso-propylpropyl, 1,2-dimethylbutyl, neohexyl, n-heptyl, 1-iso-propylbutyl, 1,4-dimethylpentyl, 2-methyl-1-iso-propylpropyl, 1-ethyl-3-methylbutyl, n-octyl, 2-ethylhexyl, 3-methyl-1-iso-propylbutyl, 2-methyl-1-iso-propylbutyl, 1-tert-butyl-2-methylpropyl, n-nonyl, n-decyl, n-undecyl, n-dodecyl and trifluoromethyl groups.

Among others, particular preference is given to a branched alkyl group having three to ten, especially three to eight, more especially three to six carbon atoms. For instance, mention is made of isopropyl, isobutyl, sec-butyl, tert-butyl, isopentyl, neopentyl, tert-pentyl (tert-amyl), 1,2-dimethylpropyl, 1,3-dimethylbutyl, 1-iso-propylpropyl, 1,2-dimethylbutyl, neohexyl, 1-iso-propylbutyl, 1,4-dimethylpentyl, 2-methyl-1-iso-propylpropyl, 1-ethyl-3-methylbutyl, 2-ethylhexyl, 3-methyl-1-iso-propylbutyl, 2-methyl-1-iso-propylbutyl and 1-tert-butyl-2-methylpropyl groups, among which isopropyl, isobutyl, sec-butyl, tert-butyl, isopentyl, neopentyl, tert-pentyl, 1,2-dimethylpropyl, 1,3-dimethylbutyl, 1-iso-propylpropyl, 1,2-dimethylbutyl and neohexyl groups are most preferred. N-propyl and trifluoromethyl groups are preferable as well.

For the aryl group represented by $A_1$, preference is given to a substituted or unsubstituted aryl group having six to fifteen carbon atoms. For instance, phenyl, tolyl, xylyl and naphthyl groups are mentioned.

For the alkoxy group represented by $A_1$ preference is given to an alkoxy group with the alkyl moiety having one to twelve carbon atoms, and for that alkyl moiety mention is made of the same alkyl groups as mentioned above. For instance, mention is made of methoxy, ethoxy, n-propoxy, isopropoxy, n-butoxy, isobutoxy, sec-butoxy, tert-butoxy, n-pentyloxy, trifluoromethoxy, isopentyloxy, neopentyloxy, tert-pentyloxy, 1,2-dimethylpropoxy, n-hexyloxy, 1,3-dimethylbutoxy, 1-iso-propylpropoxy, 1,2-dimethylbutoxy, neo-hexyloxy, n-heptyloxy, 1-iso-propylbutoxy, 1,4-dimethyl-pentyloxy, 2-methyl-1-iso-propylpropoxy, 1-ethyl-3-methyl-butoxy, n-octyloxy, 2-ethylhexyloxy, 3-methyl-1-iso-propyl-butoxy, 2-methyl-1-iso-propylbutoxy, 1-tert-butyl-2-methylpropoxy, n-nonyloxy, n-decyloxy, n-undecyloxy and n-dodecyloxy.

Among others, preference is given to an alkoxy group in which the alkyl moiety has a branched alkyl group. For the branched alkyl group those stated with reference to $A_1$ are again mentioned, with preferred examples being the same. Particularly preferable alkoxy groups are isobutoxy, sec-butoxy, tert-butoxy, isopentyloxy, neopentyloxy, tert-pentyloxy, 1,2-dimethylpropoxy, 1,3-dimethylbutoxy, 1-iso-propylpropoxy, 1,2-dimethylbutoxy and neohexyloxy groups.

For the aryloxy group represented by $A_1$, for instance, a phenoxy group is mentioned.

For the aralkyl group represented by $A_1$, for instance, benzyl and phenetyl groups are mentioned.

For the halogen atom represented by $A_1$, for instance, mention is made of chlorine, bromine, iodine and fluorine, among which bromine is most preferred.

For the ester group represented by $A_1$, for instance, mention is made of methoxycarbonyl, ethoxycarbonyl, n-propoxycarbonyl, isopropoxycarbonyl, n-butoxycarbonyl, iso-butoxycarbonyl, sec-butoxycarbonyl, tert-butoxycarbonyl, acetoxy and benzoyloxy groups.

In particular, preference is given to ester groups with the alkyl group moiety being a branched alkyl group, such as isopropoxycarbonyl, isobutoxycarbonyl, sec-butoxycarbonyl, and tert-butoxycarbonyl groups.

For the acyl group represented by $A_1$, for instance, acetyl, propionyl, butyryl, isobutyryl, valeryl and iso-valeryl groups are mentioned.

In particular, preference is given to an acyl group with the alkyl group moiety being a branched alkyl group, for instance, isobutyryl and isovaleryl groups.

For the amino group represented by $A_1$, for instance, mention is made of substituted or unsubstituted amino, methylamino, ethylamino, n-propylamino, isopropylamino, n-butylamino, isobutylamino and sec-butylamino groups. In particular, preference is given to an amino group having a branched alkyl group as the substituent, for example, isopropylamino, isobutylamino and sec-butylamino groups.

For the amido group represented by $A_1$, for instance, acetamido, propionylamido, butyrylamido, isobutyrylamido, valerylamido and isovalerylamido groups. In particular, preference is given to an amido group having a branched alkyl group, for example, isobutyrylamido and isovalerylamido groups.

For the carbamoyl group represented by $A_1$, for instance, mention is made of substituted or unsubstituted carbamoyl, methylcarbamoyl, ethylcarbamoyl, n-propylcarbamoyl, isopropylcarbamoyl, n-butylcarbamoyl, isobutylcarbamoyl, sec-butylcarbamoyl and benzamido groups. In particular, preference is given to a carbamoyl group having a branched alkyl group, for example, isopropylcarbamoyl, isobutylcarbamoyl and sec-butylcarbamoyl groups.

For the sulfonyl group represented by $A_1$, mention is made of those having an alkyl or aryl group introduced therein, for instance, methylsulfonyl, ethylsulfonyl, n-propylsulfonyl, isopropylsulfonyl, n-butylsulfonyl, isobutylsulfonyl, sec-butylsulfonyl and phenylsulfonyl groups.

In particular, sulfonyl groups having a branched alkyl group, especially isopropylsulfonyl, isobutylsulfonyl and sec-butylsulfonyl groups are preferable.

For the sulfamoyl group represented by $A_1$, for instance, substituted or unsubstituted sulfamoyl, methylsulfamoyl, ethylsulfamoyl, n-propylsulfamoyl, isopropylsulfamoyl, n-butylsulfamoyl, isobutylsulfamoyl and sec-butylsulfamoyl groups are mentioned.

In particular, preference is given to sulfamoyl groups having a branched alkyl group, for instance, isopropylsulfamoyl, isobutylsulfamoyl and sec-butylsulfamoyl groups.

For the alkylthio group represented by $A_1$, for instance, methylthio, ethylthio, n-propylthio, isopropylthio, n-butylthio, isobutylthio, sec-butylthio and tert-butylthio groups are mentioned. In particular, preference is given to alkylthio groups having a branched alkyl group, for instance, isopropylthio, isobutylthio, sec-butylthio and tert-butylthio groups.

Phenylthio is typically mentioned for the arylthio group represented by $A_1$.

Phenylazo is typically mentioned for the arylazo group represented by $A_1$.

Among these monovalent substituents represented by $A_1$, preference is given to those having an alkyl or aryl group or a halogen, especially a branched alkyl group or an alkoxy group, ester group, acyl group, amino group, amido group, carbamoyl group, sulfonyl group, sulfamoyl group or alkylthio group having a branched alkyl group. Particular preference is given to a branched alkyl group or an alkoxy group having a branched alkyl group, esp., a branched alkyl group.

In formula (2), $A_2$ stands for a hydrogen atom or a monovalent substituent bulkier than a hydrogen atom. For the monovalent substituent represented by $A_2$, those mentioned with reference to A1 are again used, with preferred examples being the same.

When two or more substituents $A_1$ and $A_2$ exist, they may be identical with, or different from, each other.

$X_1$ and $X_2$ may each be a hydrogen atom or a monovalent substituent. Alternatively, $X_1$ and $X_2$ may combine with each other to form a single bond.

For the monovalent substituents represented by $X_1$ and $X_2$, those stated with reference to $A_1$ are again used, with preferred examples being the same.

Preferably, $X_1$ and $X_2$ are each a hydrogen atom or, in the alternative, when the carbon or heterocyclic ring completed by Z is an aromatic ring, they form together a single bond.

The carbon or heterocyclic ring completed by Z may have a substituent other than the above-mentioned monovalent substituents represented by $A_1$ or $A_2$, and $X_1$ and $X_2$.

For that substituent, those exemplified for $A_1$ are again mentioned. Alkenyl groups such as allyl groups, too, may be used.

Letter q1 stands for an integer of 1 to 4, while each of q2, q3 and q4 stands for 0 or an integer of 1 to 4; that is, q1+q2+q3+q4=an integer of 1 to 16, preferably an integer of 2 to 8. More preferably, q1=q2=q3=q4=1.

R stands for a monovalent substituent, for which those exemplified for $A_1$ are again mentioned. 0 or an integer of 1 to 4 is represented by each of r1, r2, r3, and r4. It is usually preferable that r1, r2, r3, and r4 are 0.

For reasons of convenience, $A_1$ is shown in formula (2) to be attached to a ring completed by Z attached via Y to one of the four isoindole rings that define the phthalocyanine ring. However, it is to be understood that the existing four isoindole rings are all equivalent.

In formula (2), the total number of carbon atoms in the carbon or heterocyclic ring completed by Z having the monovalent substituents $A_1$ and $A_2$ is preferably at least 12, more preferably at least 20, and most preferably at least 25. The same applied to even when two or more rings including the monovalent substituents $A_1$ and $A_2$ exist. If only an improvement in solubility is taken into consideration, no particular limitation is then imposed on the upper limit of the total number of carbon atoms. To achieve reliable optical recording media, however, it is desired that the upper limit of the total number of carbon atoms be about 100, especially about 70. In other words, when the total number of carbon atoms is too large, there is a melting point decrease, which may make it difficult to achieve reliability. The same applies to formula (6).

In the (Z) ring completed by Z, a plurality of bulkier groups $A_1$ or $A_2$ may be attached to both carbon atoms (at the ortho position) adjacent to the carbon atom attached to Y. The number of the bulkier groups $A_1$ or $A_2$ attached at the ortho position of the same Z ring may be two in the case of the aromatic ring and two to four in the case of the aliphatic ring. In other words, the number of $A_1$ ($A_2$) attached to the ortho position is sixteen at maximum, if four Z rings exist per phthalocyanine molecule. If is then preferable that the total number of carbon atoms of the bulkier groups $A_1$ ($A_2$) present at the ortho positions of the Z rings are at least five, particularly six to one hundred. It is also preferred that at least four halogens per molecule are attached to the ortho positions of the Z rings.

Preferred among the dyes having formula (2) are those represented by formulae (3) and (4).

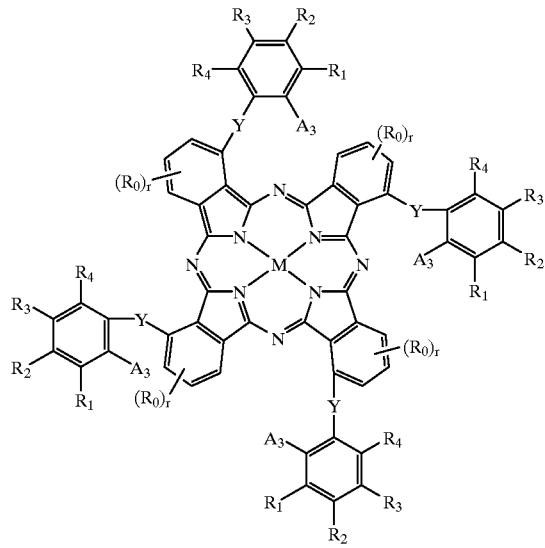

(3)

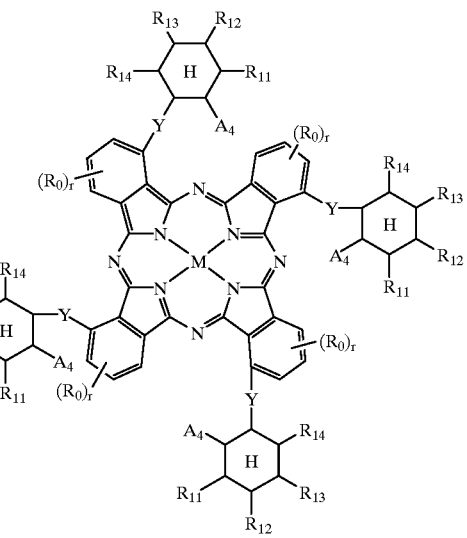

(4)

In formulae (3) and (4), M and Y have the same meanings as defined with reference to formula 2, with preferred examples being the same. In formula (3), $A_3$ stands for a monovalent substituent bulkier than a hydrogen atom, and has the same meanings as defined with reference to $A_1$ in formula (2), with preferable examples being the same.

In formula (3), $R_1$, $R_2$, $R_3$ and $R_4$, which may be identical with or different from each other, are each a hydrogen atom or a monovalent substituent. The monovalent substituent used herein may be those mentioned with reference to $A_1$ in formula (2) or, in the alternative, may be an alkenyl group such as an allyl group. Preferably, the substituents $R_{1-4}$ are each a hydrogen atom, an alkyl group having one to five carbon atoms, an alkoxy group or a halogen atom. In particular, it is preferable that $R_1$ is a hydrogen atom or an alkoxy group, while $R_3$ and $R_4$ are each a hydrogen atom, a lower alkyl group (e.g., a methyl group), a halogen atom or an aryl group (e.g., a phenyl group). $R_2$ may be a hydrogen atom, a lower alkyl group, a substituted alkyl group (e.g., a methoxybenzyl group) or an aryl group (e.g., a phenyl group). Preferably, $R_2$ is the same group as $A_3$ (an alkyl group, a halogen atom or the like). It is also preferable that $R_2$ is a halogen atom different from that for $A_3$; for instance, $A_3$ and $R_2$ are Br and Cl, respectively.

It is particularly preferable that $R_4$ is an alkyl group having one to three, esp., one or two carbon atoms (such as a methyl, ethyl, n-propyl or isopropyl group).

For reasons of convenience, the bond site for the substituent $A_3$ is the benzene ring attached to the phthalocyanine ring via Y is shown in formula (3) to be fixed. However, it is to be understood that the bond sites for $A_3$ and $R_4$ are equivalent.

In formula (4), $A_4$ stands for a monovalent substituent bulkier than a hydrogen atom, and has the same meanings as defined with reference to $A_1$ in formula (2), with preferable examples being the same.

In formula (4), $R_{11}$, $R_{12}$, $R_{13}$ and $R_{14}$ have the same meanings as defined with reference to $R_1$, $R_2$, $R_3$ and $R_4$ in formula (3), respectively, with preferable combinations with $A_4$ being the same. It is here to be noted that $A_4$ is to $R_{14}$ in formula (4) what $A_3$ is to $R_4$ in formula (3).

In formulae (3) and (4), $R_0$ is a monovalent substituent and r is 0 or an integer of 1 to 3. The monovalent substituent represented by $R_0$ may be the same as mentioned with reference to $A_1$ in formula (2). Alternatively, $R_0$ may be the same group as Y with $A_3$ having a substituted phenyl group or $A_4$ having a substituted cyclohexyl group. Preferably, r is 0. When $R_0$ is the same group as the above-mentioned Y, two or more groups Y may be identical with or different from each other.

In formulae (3) and (4), Y is shown to be attached to either one of the 4- and 7-positions of the isoindole ring of the phthalocyanine ring, the structure of which is schematically shown in structural formula (9). However, it is to be understood that to which position of the isoindole ring Y is attached is of no significance, and this shall apply to other similar structural formulae (5).

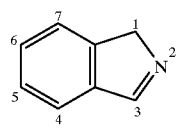

(9)

The phthalocyanine dye used herein may include a group of formula (5). $A_1$, Y and $Z_1$ in formula (5) have the same meanings as will be mentioned in detail with reference to formula (6). It is here to be noted that the dyes of formulae (6) and (2) overlap each other.

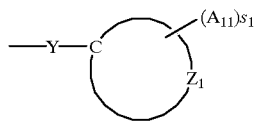

In formula (6), M, Y, q1–q4, and r1–r4 have the same meanings as mentioned with reference to formula (2), with preferable examples being the same.

$Z_1$ stands for the group of atoms required to complete a carbon or heterocyclic ring together with a carbon atom (C). The carbon or heterocyclic rings completed by $Z_1$ are the same as those completed by Z in formula (2), with preferable examples being the same.

$A_{11}$ stands for a monovalent substituent having a branched alkyl group. The monovalent substituent having a branched alkyl group may be selected from those represented by $A_1$ is formula (2) and having a branched alkyl group. Preferable are alkyl, alkoxy, alkylthio and amino groups, among which alkyl and alkoxy groups are more preferable. Most preferable are those mentioned with reference to formula (2). Letter s1 is an integer of at least 1, while s2 is 0 or an integer of at least 1.

When two or more substituents $A_{11}$ exits, they may be identical with or different from each other. The substituent $A_{11}$ may have another substituent.

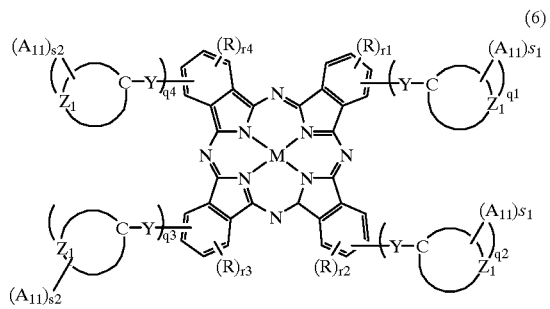

In formula (6), the ring completed by Z1 attached Y to one of the four isoindole rings forming the phthalocyanine ring is shown to necessarily have the substituent $A_{11}$ for reasons of convenience. However, it is to be understood that the existing four isoindole rings are all equivalent.

Preferred among the dyes of formula (6) are those represented by formulae (7) and (8).

In formulae (7) and (8), M and Y have the same meanings as mentioned with reference to formula (6), with preferable examples being the same.

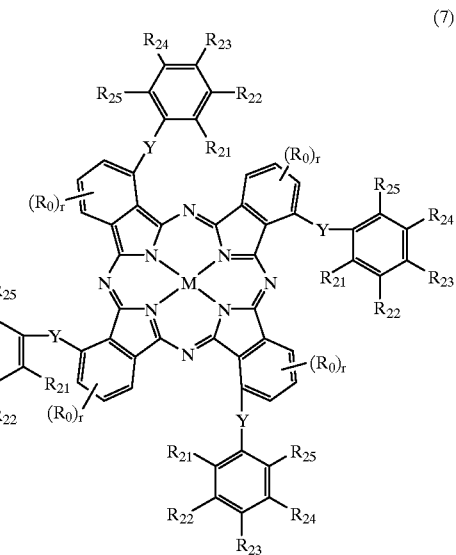

In formula (7), $R_{21}$, $R_{22}$, $R_{23}$, $R_{24}$ and $R_{25}$ are each a hydrogen atom or a monovalent substituent, and at least of the substituents $R_{21-25}$ is a monovalent substituent having a branched alkyl group. The monovalent substituent used herein may be the same as mentioned with reference to $A_1$ in formula (2) and the monovalent substituent having a branched alkyl group may be the same as mentioned with reference to formula (6), again, with preferable examples being the same. In particular, it is preferable that either one of $R_{21}$ and $R_{25}$ attached to the position adjacent to the bond site for Y is a monovalent substituent having a branched alkyl group. When either one of $R_{21}$ and $R_{25}$ is a monovalent substituent having a branched alkyl group, it is preferable that the remaining one $R_{21}$ or $R_{25}$ is an alkyl group having one to three, esp., one or two carbon atoms (such as a methyl, ethyl, n-propyl or isopropyl group).

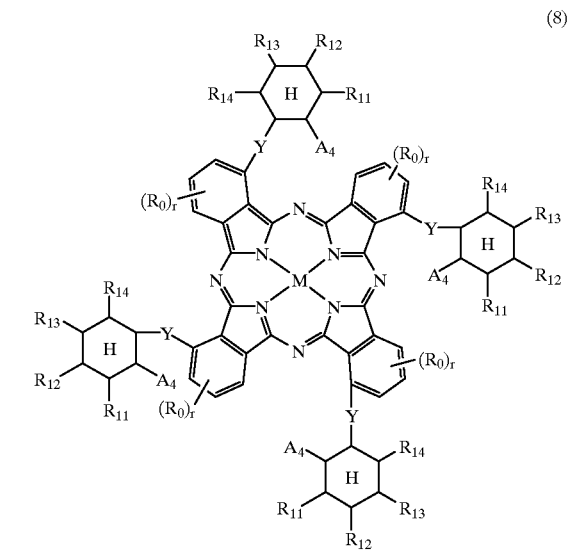

In formula (8), $R_{31}$, $R_{32}$, $R_{33}$, $R_{34}$ and $R_{35}$ are each a hydrogen atom or a monovalent substituent, and have the same meanings as mentioned in connection with $R_{21-25}$ in formula (7). It is again preferably that either one of $R_{31}$ and $R_{35}$ is a monovalent substituent having a branched alkyl group. In this case, too, it is preferable that when either one of $R_{31}$ and $R_{35}$ is a monovalent substituent having a branched alkyl group, the other is an alkyl group having one to three, esp., one or two carbon atoms.

In formulae (7) and (8), $R_0$ and r have the same meanings as mentioned in connection with formulae (4) and (5), with preferable examples being the same. $R_0$ may also be provided by a group formed by the attachment to Y of a phenyl or cyclohexyl group having $R_{31-35}$. When two or more substituents Y exist, they may be identical with or different from each other.

By way of example but not by way of limitation, set out below are a large number of preferable examples of the phthalocyanine dye used herein. Examples of the dye represented by formula (3) are Dye Nos. I-1 to I-105 with various combination of M and Y; examples of the dye represented by formula (4) are Dye Nos. II-1 to II-105 with various combinations of M and Y; examples of the dye represented by formula (7) are Dye Nos. III-1 to III-46 with various combinations of M and Y; and examples of the dye represented by formula (8) are Dye Nos. IV-1 to IV-46 with various combinations of M and Y. Since examples of the dyes of formulae (3) and (7), and examples of the dyes of formulae (4) and (8) overlap each other, the dye examples conforming to both formulae (3) and (7) are represented by formula (3) and the dye examples conforming to both formulae (4) and (8) are represented by formula (4).

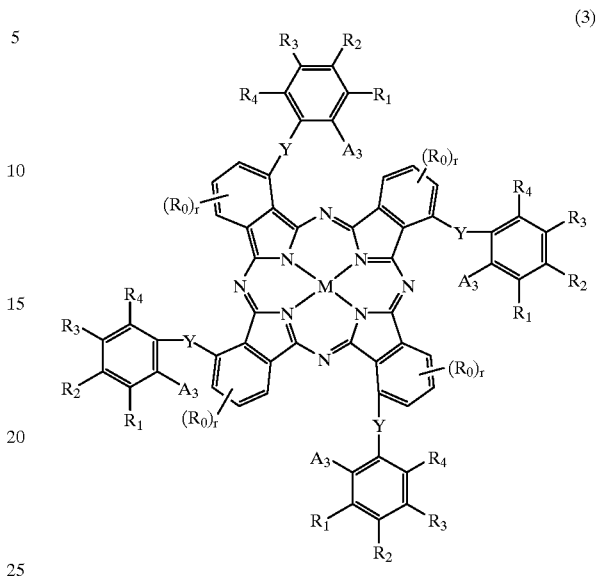

(3)

| Phthalocyanine Dyes Represented by Formula (3) Dye Nos. I-1 through I-105 | | | | | | | | |
|---|---|---|---|---|---|---|---|---|
| Dye No. | M | Y | $A_3$ | $R_1$ | $R_2$ | $R_3$ | $R_4$ | $R_0$ r |
| I-1 | Cu | O | tert-$C_4H_9$ | H | tert-$C_4H_9$ | H | H | — 0 |
| I-2 | Pd | O | tert-$C_4H_9$ | H | tert-$C_4H_9$ | H | H | — 0 |
| I-3 | Cu | O | tert-$C_4H_9$ | H | H | $CH_3$ | H | — 0 |
| I-4 | Cu | O | tert-$C_4H_9$ | H | H | H | H | — 0 |
| I-5 | Pd | O | tert-$C_4H_9$ | H | H | H | H | — 0 |
| I-6 | Cu | O | sec-$C_4H_9$ | H | H | H | H | — 0 |
| I-7 | Ni | O | sec-$C_4H_9$ | H | H | H | H | — 0 |
| I-8 | Cu | O | $CH_3$ | H | H | H | H | — 0 |
| I-9 | Cu | O | tert-$C_4H_9$ | H | H | H | $CH_3$ | — 0 |
| I-10 | Cu | O | tert-$C_4H_9$ | H | $CH_3$ | H | H | — 0 |
| I-11 | Cu | O | iso-$C_3H_7$ | H | H | $CH_3$ | H | — 0 |
| I-12 | Cu | O | tert-$C_5H_{11}$ | H | tert-$C_5H_{11}$ | H | H | — 0 |
| I-13 | Cu | O | iso-$C_3H_7$ | H | Cl | $CH_2$ | H | — 0 |
| I-14 | Pd | O | iso-$C_3H_7$ | H | Cl | $CH_3$ | H | — 0 |
| I-15 | Cu | O | Ph | H | H | H | H | — 0 |
| I-16 | Pd | O | Ph | H | H | H | H | — 0 |
| I-17 | Cu | O | Br | H | H | H | H | — 0 |
| I-18 | Cu | O | Br | H | Br | H | H | — 0 |
| I-19 | Cu | O | $CH_3$ | H | H | H | $CH_3$ | — 0 |
| I-20 | Cu | O | iso-$C_3H_7$ | H | H | H | $CH_3$ | — 0 |
| I-21 | Cu | O | tert-$c_5H_{11}$ | H | H | H | H | — 0 |
| I-22 | Cu | O | tert-$C_4H_9$ | H | H | H | iso-$C_3H_7$ | — 0 |
| I-23 | Cu | O | tert-$C_4H_9$ | H | H | H | $C_2H_5$ | — 0 |
| I-24 | Cu | O | tert-$C_4H_9O$ | H | H | H | H | — 0 |
| I-25 | Cu | O | tert-$C_4H_9$ | H | tert-$C_4H_9$ | H | $CH_3$ | — 0 |
| I-26 | Cu | O | tert-$C_6H_{11}$ | H | H | H | $CH_3$ | — 0 |
| I-27 | Cu | O | tert-$C_4H_9$ | H | iso-$C_3H_7$ | H | $C_2H_5$ | — 0 |
| I-28 | Cu | O | tert-$C_4H_9$ | H | $C_2H_5$ | H | $CH_3$ | — 0 |
| I-29 | Cu | O | iso-$C_4H_9$ | H | H | H | $CH_3$ | — 0 |
| I-30 | Cu | O | sec-$C_4H_9$ | H | H | H | $CH_3$ | — 0 |
| I-31 | Cu | O | n-$C_3H_7$ | H | H | H | h | — 0 |
| I-32 | Cu | O | iso-$C_3H_7O$ | H | H | H | H | — 0 |
| I-33 | Cu | S | iso-$C_3H_7$ | H | H | H | H | — 0 |
| I-34 | Cu | S | tert-$C_4H_9$ | H | H | H | H | — 0 |
| I-35 | Pd | S | tert-$C_4H_9$ | H | H | H | H | — 0 |
| I-36 | Zn | O | tert-$C_4H_9$ | H | tert-$C_4H_9$ | H | H | — 0 |
| I-37 | Ni | O | tert-$C_4H_9$ | H | tert-$C_4H_9$ | H | H | — 0 |
| I-38 | Ni | O | Ph | H | H | H | H | — 0 |
| I-39 | Cu | O | $CF_3$ | H | H | H | — | — 0 |
| I-40 | Zn | O | Ph | H | H | H | H | — 0 |
| I-41 | Cu | O | —OPh | H | H | H | H | — 0 |

-continued

Phthalocyanine Dyes Represented by Formula (3)
Dye Nos. I-1 through I-105

| Dye No. | M | Y | $A_3$ | $R_1$ | $R_2$ | $R_3$ | $R_4$ | $R_0$ | r |
|---|---|---|---|---|---|---|---|---|---|
| I-42 | Cu | O | —CH$_3$-Ph | H | H | H | H | — | 0 |
| I-43 | Cu | O | —COOH | H | H | H | H | — | 0 |
| I-44 | Cu | O | —COOCH$_3$ | H | H | H | H | — | 0 |
| I-45 | Cu | O | —OCOCH$_3$ | H | H | H | H | — | 0 |
| I-46 | Cu | O | —COCH$_3$ | H | H | H | H | — | 0 |
| I-47 | Cu | O | —NH$_2$ | H | H | H | H | — | 0 |
| I-48 | Cu | O | —NHCOCH$_3$ | H | H | H | H | — | 0 |
| I-49 | Cu | O | —CONH$_2$ | H | H | H | H | — | 0 |
| I-50 | Cu | O | —SO$_2$CH$_3$ | H | H | H | H | — | 0 |
| I-51 | Cu | O | —SO$_2$-Ph | H | H | H | H | — | 0 |
| I-52 | Cu | O | —S—C$_2$H$_5$ | H | H | H | H | — | 0 |
| I-53 | Cu | O | —S-Ph | H | H | H | H | — | 0 |
| I-54 | Cu | O | —SO$_3$H | H | H | H | H | — | 0 |
| I-55 | Cu | O | —SO$_2$H | H | H | H | H | — | 0 |
| I-56 | Cu | O | tert-C$_4$H$_9$ | H | H | H | H | Br | 3 |
| I-57 | Cu | O | —NO$_2$ | H | H | H | H | — | 0 |
| I-58 | Cu | O | tert-C$_4$H$_9$ | H | 4-methoxy-benzyl | H | tert-C$_4$H$_9$ | — | 0 |
| I-59 | Cu | O | —OCH$_3$ | —OCH$_3$ | H | H | H | — | 0 |
| I-60 | Cu | O | —OCH$_3$ | H | allyl | H | H | — | 0 |
| I-61 | Cu | O | tert-C$_4$H$_9$ | H | tert-C$_4$H$_9$ | H | tert-C$_4$H$_9$ | — | 0 |
| I-62 | Cu | O | Ph | H | Ph | H | Ph | — | 0 |
| I-63 | Cu | O | tert-C$_4$H$_9$ | H | CH$_3$ | H | tert-C$_4$H$_9$ | — | 0 |
| I-64 | Cu | O | tert-C$_4$H$_9$ | H | H | F | F | — | 0 |
| I-65 | Cu | O | iso-C$_5$H$_{11}$ | H | H | H | CH$_3$ | — | 0 |
| I-66 | Cu | O | neo-C$_5$H$_{11}$ | H | H | H | CH$_3$ | — | 0 |
| I-67 | Cu | O | 1,2-dimethylpropyl | H | H | H | CH$_3$ | — | 0 |
| I-68 | Cu | O | 1,3-dimethylpropyl | H | H | H | CH$_3$ | — | 0 |
| I-69 | Cu | O | 1-iso-propylpropyl | H | H | H | CH$_3$ | — | 0 |
| I-70 | Cu | O | 1,2-dimethylbutyl | H | H | H | CH$_3$ | — | 0 |
| I-71 | Cu | O | neo-C$_6$H$_{13}$ | H | H | H | CH$_3$ | — | 0 |
| I-72 | Pd | O | tert-C$_4$H$_9$ | H | H | H | CH$_3$ | — | 0 |
| I-73 | Ni | O | tert-C$_4$H$_9$ | H | H | H | CH$_3$ | — | 0 |
| I-74 | Cu | S | tert-C$_4$H$_9$ | H | H | H | CH$_3$ | — | 0 |
| I-75 | Cu | S | tert-C$_4$H$_9$ | H | H | H | iso-C$_3$H$_7$ | — | 0 |
| I-76 | Cu | O | iso-C$_4$H$_9$O | H | H | H | CH$_3$ | — | 0 |
| I-77 | Cu | O | sec-C$_4$H$_9$O | H | H | H | CH$_3$ | — | 0 |
| I-78 | Cu | O | tert-C$_4$H$_9$O | H | H | H | CH$_3$ | — | 0 |
| I-79 | Cu | O | 1,2-dimethylpropoxy | H | H | H | CH$_3$ | — | 0 |
| I-80 | Cu | O | 1,3-dimethylpropoxy | H | H | H | CH$_3$ | — | 0 |
| I-81 | Cu | O | 1-iso-propylpropoxy | H | H | H | CH$_3$ | — | 0 |
| I-82 | Cu | O | 1,2-dimethylbutoxy | H | H | H | CH$_3$ | — | 0 |
| I-83 | Cu | O | neo-C$_6$H$_{13}$O | H | H | H | CH$_3$ | — | 0 |
| I-84 | Cu | S | tert-C$_4$H$_9$O | H | H | H | CH$_3$ | — | 0 |
| I-85 | Pd | O | tert-C$_4$H$_9$O | H | H | H | CH$_3$ | — | 0 |
| I-86 | Ni | O | tert-C$_4$H$_9$O | H | H | H | CH$_3$ | — | 0 |
| I-87 | Ni | S | tert-C$_4$H$_9$ | H | H | H | CH$_3$ | — | 0 |
| I-88 | Cu | O | iso-C$_3$H$_7$COO— | H | H | H | CH$_3$ | — | 0 |
| I-89 | Cu | O | —OCOPh | H | H | H | CH$_3$ | — | 0 |
| I-90 | Cu | O | iso-C$_3$H$_7$CO— | H | H | H | CH$_3$ | — | 0 |
| I-91 | Cu | O | iso-C$_3$H$_7$NH— | H | H | H | CH$_3$ | — | 0 |
| I-92 | Cu | O | iso-C$_3$H$_7$CONH— | H | H | H | CH$_3$ | — | 0 |
| I-93 | Cu | O | iso-C$_3$H$_7$NHCO— | H | H | H | CH$_3$ | — | 0 |
| I-94 | Cu | O | iso-C$_3$H$_7$SO$_2$— | H | H | H | CH$_3$ | — | 0 |
| I-95 | Cu | O | iso-C$_3$H$_7$NHSO$_2$— | H | H | H | CH$_3$ | — | 0 |
| I-96 | Cu | O | iso-C$_3$H$_7$S | H | H | H | CH$_3$ | — | 0 |
| I-97 | Cu | O | iso-C$_4$H$_9$S | H | H | H | CH$_3$ | — | 0 |
| I-98 | Cu | O | sec-C$_4$H$_9$S | H | H | H | CH$_3$ | — | 0 |
| I-99 | Cu | O | tert-C$_4$H$_9$S | H | H | H | CH$_3$ | — | 0 |
| I-100 | Cu | S | tert-C$_4$H$_9$S | H | H | H | CH$_3$ | — | 0 |
| I-101 | Pd | S | tert-C$_4$H$_9$O | H | H | H | CH$_3$ | — | 0 |
| I-102 | Ni | S | tert-C$_4$H$_9$O | H | H | H | CH$_3$ | — | 0 |
| I-103 | Cu | O | iso-C$_5$H$_{11}$O | H | H | H | CH$_3$ | — | 0 |
| I-104 | Cu | O | neo-C$_5$H$_{11}$O | H | H | H | CH$_3$ | — | 0 |
| I-105 | Cu | O | tert-C$_5$H$_{11}$O | H | H | H | CH$_3$ | — | 0 |

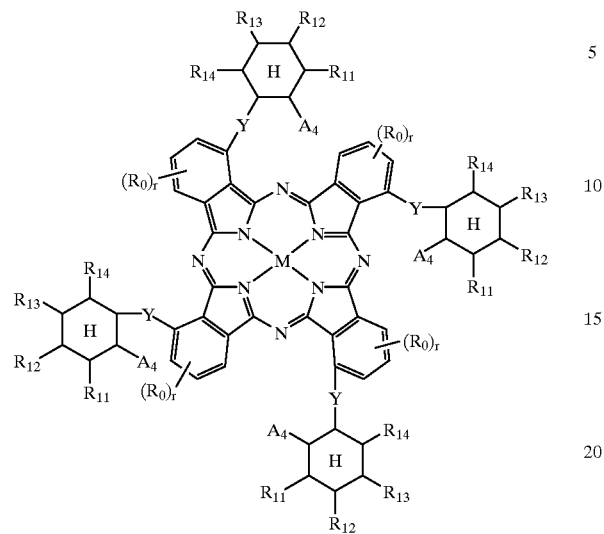

(4)

Phthalocyanine Dyes Represented by Formula (4)
Dye Nos. II-1 through II-105

| Dye No. | M | Y | $A_4$ | $R_{11}$ | $R_{12}$ | $R_{13}$ | $R_{14}$ | $R_0$ | r |
|---|---|---|---|---|---|---|---|---|---|
| II-1 | Cu | O | tert-$C_4H_9$ | H | tert-$C_4H_9$ | H | H | — | 0 |
| II-2 | Pd | O | tert-$C_4H_9$ | H | tert-$C_4H_9$ | H | H | — | 0 |
| II-3 | Cu | O | tert-$C_4H_9$ | H | H | $CH_3$ | H | — | 0 |
| II-4 | Cu | O | tert-$C_4H_9$ | H | H | H | H | — | 0 |
| II-5 | Pd | O | tert-$C_4H_9$ | H | H | H | H | — | 0 |
| II-6 | Cu | O | sec-$C_4H_9$ | H | H | H | H | — | 0 |
| II-7 | Ni | O | sec-$C_4H_9$ | H | H | H | H | — | 0 |
| II-8 | Cu | O | $CH_3$ | H | H | H | H | — | 0 |
| II-9 | Cu | O | tert-$C_4H_9$ | H | H | H | $CH_3$ | — | 0 |
| II-10 | Cu | O | tert-$C_4H_9$ | H | $CH_3$ | H | H | — | |
| II-11 | Cu | O | iso-$C_3H_7$ | H | H | $CH_3$ | H | — | 0 |
| II-12 | Cu | O | tert-$C_5H_{11}$ | H | tert-$C_5H_{11}$ | H | H | — | 0 |
| II-13 | Cu | O | iso-$C_3H_7$ | H | Cl | $CH_3$ | H | — | 0 |
| II-14 | Pd | O | iso-$C_3H_7$ | H | Cl | $CH_3$ | H | — | 0 |
| II-15 | Cu | O | Ph | H | H | H | H | — | 0 |
| II-16 | Pd | O | Ph | H | H | H | H | — | 0 |
| II-17 | Cu | O | Br | H | H | H | H | — | 0 |
| II-18 | Cu | O | Br | H | Br | H | H | — | 0 |
| II-19 | Cu | O | $CH_3$ | H | H | H | $CH_3$ | — | 0 |
| II-20 | Cu | O | iso-$C_3H_7$ | H | H | H | $CH_3$ | — | 0 |
| II-21 | Cu | O | tert-$C_5H_{11}$ | H | H | H | H | — | 0 |
| II-22 | Cu | O | tert-$C_4H_9$ | H | H | H | iso-$C_3H_7$ | — | 0 |
| II-23 | Cu | O | tert-$C_4H_9$ | H | H | H | $C_2H_5$ | — | 0 |
| II-24 | Cu | O | tert-$C_4H_9O$ | H | H | H | H | — | 0 |
| II-25 | Cu | O | tert-$C_4H_9$ | H | tert-$C_4H_9$ | H | $CH_3$ | — | 0 |
| II-26 | Cu | O | tert-$C_5H_{11}$ | H | H | H | $CH_3$ | — | 0 |
| II-27 | Cu | O | tert-$C_4H_9$ | H | iso-$C_3H_7$ | H | $C_2H_5$ | — | 0 |
| II-28 | Cu | O | tert-$C_4H_9$ | H | $C_2H_5$ | H | $CH_3$ | — | 0 |
| II-29 | Cu | O | iso-$C_4H_9$ | H | H | H | $CH_3$ | — | 0 |
| II-30 | Cu | O | sec-$C_4H_9$ | H | H | H | $CH_3$ | — | 0 |
| II-31 | Cu | O | n-$C_3H_7$ | H | H | H | H | — | 0 |
| II-32 | Cu | O | iso-$C_3H_7O$ | H | H | H | H | — | 0 |
| II-33 | Cu | S | iso-$C_3H_7$ | H | 11 | H | H | — | 0 |
| II-34 | Cu | S | tert-$C_4H_9$ | H | H | H | H | — | 0 |
| II-35 | Pd | S | tert-$C_4H_9$ | H | H | H | H | — | 0 |
| II-36 | Zn | O | tert-$C_4H_9$ | H | tert-$C_4H_9$ | H | H | — | 0 |
| II-37 | Ni | O | tert-$C_4H_9$ | H | tert-$C_4H_9$ | H | H | — | 0 |
| II-38 | Ni | O | Ph | H | H | H | H | — | 0 |
| II-39 | Cu | O | $CF_3$ | H | H | H | H | — | 0 |
| II-40 | Zn | O | Ph | H | H | H | H | — | 0 |
| II-41 | Cu | O | —OPh | H | H | H | H | — | 0 |
| II-42 | Cu | O | —$CH_3$-Ph | H | H | H | H | — | 0 |
| II-43 | Cu | O | —COOH | H | H | H | H | — | 0 |

-continued

Phthalocyanine Dyes Represented by Formula (4)
Dye Nos. II-1 through II-105

| Dye No. | M | Y | $A_4$ | $R_{11}$ | $R_{12}$ | $R_{13}$ | $R_{14}$ | $R_0$ | r |
|---|---|---|---|---|---|---|---|---|---|
| II-44 | Cu | O | —COOCH$_3$ | H | H | H | H | — | 0 |
| II-45 | Cu | O | —OCOCH$_5$ | H | H | H | H | — | 0 |
| II-46 | Cu | O | —COCH$_3$ | H | H | H | H | — | 0 |
| II-47 | Cu | O | —NH$_2$ | H | H | H | H | — | 0 |
| II-48 | Cu | O | —NHCOCH$_3$ | H | H | H | H | — | 0 |
| II-49 | Cu | O | —CONH$_2$ | H | H | H | H | — | 0 |
| II-50 | Cu | O | —SO$_2$CH$_3$ | H | H | H | H | — | 0 |
| II-51 | Cu | O | —SO$_2$-Ph | H | H | H | H | — | 0 |
| II-52 | Cu | O | —S—C$_2$H$_5$ | H | H | H | H | — | 0 |
| II-53 | Cu | O | —S-Ph | H | H | H | H | — | 0 |
| II-54 | Cu | O | —SO$_3$H | H | H | H | H | — | 0 |
| II-55 | Cu | O | —SO$_2$H | H | H | H | H | — | 0 |
| II-56 | Cu | O | tert-C$_4$H$_9$ | H | H | H | H | Br | 3 |
| II-57 | Cu | O | —NO$_2$ | H | H | H | H | — | 0 |
| II-58 | Cu | O | tert-C$_4$H$_9$ | H | 4-methoxybenzyl | H | tert-C$_4$H$_9$ | — | 0 |
| II-59 | Cu | O | —OCH$_3$ | —OCH$_3$ | H | H | H | — | 0 |
| II-60 | Cu | O | —OCH$_3$ | H | allyl | H | H | — | 0 |
| II-61 | Cu | O | tert-C$_4$H$_9$ | H | tert-C$_4$H$_9$ | H | tert-C$_4$H$_9$ | — | 0 |
| II-62 | Cu | O | Ph | H | Ph | H | Ph | — | 0 |
| II-63 | Cu | O | tert-C$_4$H$_9$ | H | CH$_3$ | H | tert-C$_4$H$_9$ | — | 0 |
| II-64 | Cu | O | tert-C$_4$H$_9$ | H | H | F | F | — | 0 |
| II-65 | Cu | O | iso-C$_5$H$_{11}$ | H | H | H | CH$_3$ | — | 0 |
| II-66 | Cu | O | neo-C$_5$H$_{11}$ | H | H | H | CH$_3$ | — | 0 |
| II-67 | Cu | O | 1,2-dimethylpropyl | H | H | H | CH$_3$ | — | 0 |
| II-68 | Cu | O | 1,3-dimethylpropyl | H | H | H | CH$_3$ | — | 0 |
| II-69 | Cu | O | 1-iso-propylpropyl | H | H | H | CH$_3$ | — | 0 |
| II-70 | Cu | O | 1,2-dimethylbutyl | H | H | H | CH$_3$ | — | 0 |
| II-71 | Cu | O | neo-C$_6$H$_{13}$ | H | H | H | CH$_3$ | — | 0 |
| II-72 | Pd | O | tert-C$_4$H$_9$ | H | H | H | CH$_3$ | — | 0 |
| II-73 | Ni | O | tert-C$_4$H$_9$ | H | H | H | CH$_3$ | — | 0 |
| II-74 | Cu | S | tert-C$_4$H$_9$ | H | H | H | CH$_3$ | — | 0 |
| II-75 | Cu | S | tert-C$_4$H$_9$ | H | H | H | iso-C$_3$H$_7$ | — | 0 |
| II-76 | Cu | O | iso-C$_4$H$_9$O | H | H | H | CH$_3$ | — | 0 |
| II-77 | Cu | O | sec-C$_4$H$_9$O | H | H | H | CH$_3$ | — | 0 |
| II-78 | Cu | O | tert-C$_4$H$_9$O | H | H | H | CH$_3$ | — | 0 |
| II-79 | Cu | O | 1,2-dimethylpropoxy | H | H | H | CH$_3$ | — | 0 |
| II-80 | Cu | O | 1,3-dimethylpropoxy | H | H | H | CH$_3$ | — | 0 |
| II-81 | Cu | O | 1-iso-propylpropoxy | H | H | H | CH$_3$ | — | 0 |
| II-82 | Cu | O | 1,2-dimethylbutoxy | H | H | H | CH$_3$ | — | 0 |
| II-83 | Cu | O | neo-C$_6$H$_{13}$O | H | H | H | CH$_3$ | — | 0 |
| II-84 | Cu | S | tert-C$_4$H$_9$O | H | H | H | CH$_3$ | — | 0 |
| II-85 | Pd | O | tert-C$_4$H$_9$O | H | H | H | CH$_3$ | — | 0 |
| II-86 | Ni | O | tert-C$_4$H$_9$O | H | H | H | CH$_3$ | — | 0 |
| II-87 | Ni | S | tert-C$_4$H$_9$ | H | H | H | CH$_3$ | — | 0 |
| II-88 | Cu | O | iso-C$_3$H$_7$COO— | H | H | H | CH$_3$ | — | 0 |
| II-89 | Cu | O | —OCOPh | H | H | H | CH$_3$ | — | 0 |
| II-90 | Cu | O | iso-C$_3$H$_7$CO— | H | H | H | CH$_3$ | — | 0 |
| II-91 | Cu | O | iso-C$_3$H$_7$NH— | H | H | H | CH$_3$ | — | 0 |
| II-92 | Cu | O | iso-C$_3$H$_7$CONH— | H | H | H | CH$_3$ | — | 0 |
| II-93 | Cu | O | iso-C$_3$H$_7$NHCO— | H | H | H | CH$_3$ | — | 0 |
| II-94 | Cu | O | iso-C$_3$H$_7$SO$_2$— | H | H | H | CH$_3$ | — | 0 |
| II-95 | Cu | O | iso-C$_3$H$_7$NHSO$_2$— | H | H | H | CH$_3$ | — | 0 |
| II-96 | Cu | O | iso-C$_2$H$_7$S | H | H | H | CH$_3$ | — | 0 |
| II-97 | Cu | O | iso-C$_4$H$_9$S | H | H | H | CH$_3$ | — | 0 |
| II-98 | Cu | O | sec-C$_4$H$_9$S | H | H | H | CH$_3$ | — | 0 |
| II-99 | Cu | O | tert-C$_4$H$_9$S | H | H | H | CH$_3$ | — | 0 |
| II-100 | Cu | S | tert-C$_4$H$_9$S | H | H | H | CH$_3$ | — | 0 |
| II-101 | Pd | S | tert-C$_4$H$_9$O | H | H | H | CH$_3$ | — | 0 |
| II-102 | Ni | S | tert-C$_4$H$_9$O | H | H | H | CH$_3$ | — | 0 |
| II-103 | Cu | O | iso-C$_5$H$_{11}$O | H | H | H | CH$_3$ | — | 0 |
| II-104 | Cu | O | neo-C$_5$H$_{11}$O | H | H | H | CH$_3$ | — | 0 |
| II-105 | Cu | O | tert-C$_5$H$_{11}$O | H | H | H | CH$_3$ | — | 0 |

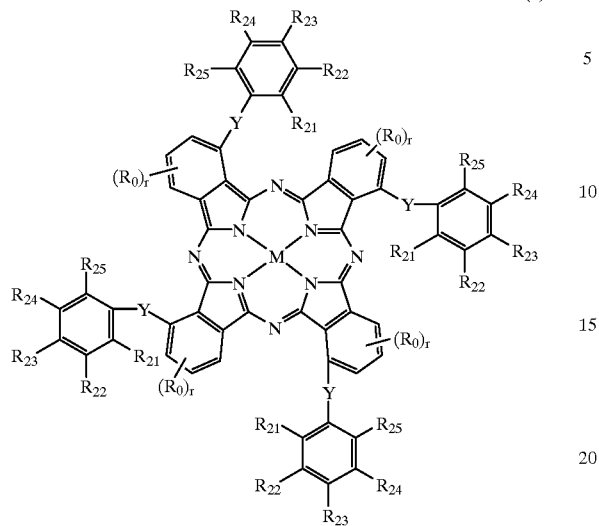

(7)

Phthalocyanine Dyes Represented by Formula (7)
Dye Nos. III-1 through III-46

| Dye No. | M | Y | R21 | R22 | R23 | R24 | R25 | R0 | r |
|---|---|---|---|---|---|---|---|---|---|
| III-1 | Cu | O | H | tert-C4H9 | H | H | H | — | 0 |
| III-2 | Cu | O | H | H | tert-C4H9 | H | H | — | 0 |
| III-3 | Cu | O | H | tert-C5H11 | H | H | H | — | 0 |
| III-4 | Cu | O | H | H | tert-C5H11 | H | H | — | 0 |
| III-5 | Cu | O | H | H | iso-C3H7 | H | H | — | 0 |
| III-6 | Cu | O | H | H | iso-C4H9 | H | H | — | 0 |
| III-7 | Cu | O | H | H | sec-C4H9 | H | H | — | 0 |
| III-8 | Cu | O | H | H | iso-C5H11 | H | H | — | 0 |
| III-9 | Cu | O | H | H | neo-C5H11 | H | H | — | 0 |
| III-10 | Cu | O | H | H | 1,2-dimethylpropyl | H | H | — | 0 |
| III-11 | Cu | O | H | H | 1,3-dimethylpropyl | H | H | — | 0 |
| III-12 | Cu | O | H | 1-iso-propylpropyl | H | H | H | — | 0 |
| III-13 | Cu | O | H | 1,2-dimethylbutyl | H | H | H | — | 0 |
| III-14 | Cu | O | H | neo-C6H13 | H | H | H | — | 0 |
| III-15 | Cu | S | H | H | tert-C4H9 | H | H | — | 0 |
| III-16 | Cu | S | H | tert-C4H9 | H | H | H | — | 0 |
| III-17 | Pd | O | H | H | tert-C4H9 | H | H | — | 0 |
| III-18 | Ni | O | H | H | tert-C4H9 | H | H | — | 0 |
| III-19 | Pd | S | H | tert-C4H9 | H | H | H | — | 0 |
| III-20 | Ni | S | H | tert-C4H9 | H | H | H | — | 0 |
| III-21 | Cu | O | H | tert-C4H9O | H | H | H | — | 0 |
| III-22 | Cu | O | H | iso-C3H7O | H | H | H | — | 0 |
| III-23 | Cu | O | H | sec-C4H9O | H | H | H | — | 0 |
| III-24 | Cu | O | H | 1,2-dimethylpropoxy | H | H | H | — | 0 |
| III-25 | Cu | O | H | 1,3-dimethylpropoxy | H | H | H | — | 0 |
| III-26 | Cu | O | H | H | tert-C4H9O | H | H | — | 0 |
| III-27 | C | O | H | H | iso-C3H7 | H | H | — | 0 |
| III-28 | Cu | O | H | H | sec-C4H9O | H | H | — | 0 |
| III-29 | Cu | O | H | H | iso-C4H9O | H | H | — | 0 |
| III-30 | Cu | O | H | H | 1-iso-propylpropoxy | H | H | — | a |
| III-31 | Cu | O | H | H | 1,2-demethylbutoxy | H | H | — | a |
| III-32 | Cu | O | H | H | neo-C6H13O | H | H | — | 0 |
| III-33 | Cu | S | H | tert-C4H9O | H | H | H | — | 0 |
| III-34 | Cu | S | H | H | tert-C4H9O | H | H | — | 0 |
| III-35 | Pd | O | H | tert-C4H9O | H | H | H | — | 0 |
| III-36 | Ni | O | H | tert-C4H9O | H | H | H | — | 0 |
| III-37 | Pd | O | H | H | tert-C4H9O | H | H | — | 0 |
| III-38 | Ni | O | H | H | tert-C4H9O | H | H | — | 0 |
| III-39 | Cu | O | H | iso-C3H7NH— | H | H | H | — | 0 |
| III-40 | Cu | O | H | H | iso-C3H7NH— | H | H | — | 0 |
| III-41 | Cu | O | H | iso-C3H7S— | H | H | H | — | 0 |
| III-42 | Cu | O | H | H | iso-C3H7S— | H | H | — | 0 |
| III-43 | Cu | O | H | iso-C5H7NH— | H | H | H | — | 0 |
| III-44 | Cu | O | H | iso-C5H11 | H | H | H | — | 0 |

-continued

Phthalocyanine Dyes Represented by Formula (7)
Dye Nos. III-1 through III-46

| Dye No. | M | Y | $R_{21}$ | $R_{22}$ | $R_{23}$ | $R_{24}$ | $R_{25}$ | $R_0$ | r |
|---|---|---|---|---|---|---|---|---|---|
| III-45 | Cu | O | H | H | neo-$C_5H_{11}$ | H | H | — | 0 |
| III-46 | Cu | O | H | tert-$C_5H_{11}$ | H | H | H | — | 0 |

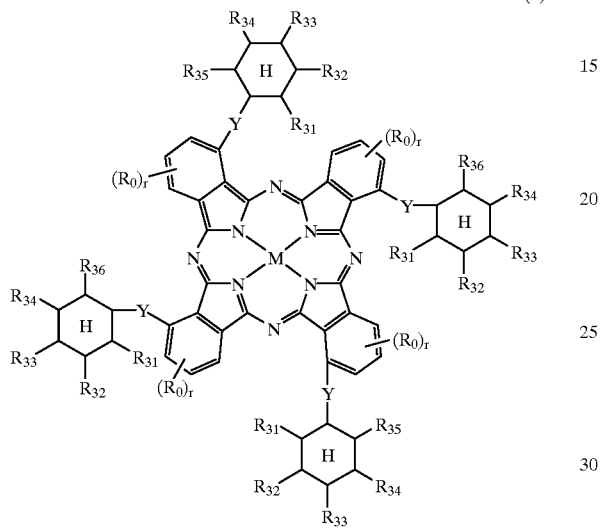

(8)

Phthalocyanine Dyes Represented by Formula (8)
Dye Nos. IV-1 through IV-46

| Dye No. | M | Y | $R_{31}$ | $R_{32}$ | $R_{33}$ | $R_{34}$ | $R_{35}$ | $R_0$ | r |
|---|---|---|---|---|---|---|---|---|---|
| IV-1 | Cu | O | H | tert-$C_4H_9$ | H | H | H | — | 0 |
| IV-2 | Cu | O | H | H | tert-$C_4H_9$ | H | H | — | 0 |
| IV-3 | Cu | O | H | tert-$C_5H_{11}$ | H | H | H | — | 0 |
| IV-4 | Cu | O | H | H | tert-$C_5H_{11}$ | H | H | — | 0 |
| IV-5 | Cu | O | H | H | iso-$C_3H_7$ | H | H | — | 0 |
| IV-6 | Cu | O | H | H | iso-$C_4H_9$ | H | H | — | 0 |
| IV-7 | Cu | O | H | H | sec-$C_4H_9$ | H | H | — | 0 |
| IV-8 | Cu | O | H | H | iso-$C_5H_{11}$ | H | H | — | 0 |
| IV-9 | Cu | O | H | H | neo-$C_5H_{11}$ | H | H | — | 0 |
| IV-10 | Cu | O | H | H | 1,2-dimethylpropyl | H | H | — | 0 |
| IV-11 | Cu | O | H | H | 1,3-dimethylpropyl | H | H | — | 0 |
| IV-12 | Cu | O | H | 1-iso-propylpropyl | H | H | H | — | 0 |
| IV-13 | Cu | O | H | 1,2-dimethylbutyl | H | H | H | — | 0 |
| IV-14 | Cu | O | H | neo-$C_6H_{13}$ | H | H | H | — | 0 |
| IV-15 | Cu | S | H | H | tert-$C_4H_9$ | H | H | — | 0 |
| IV-16 | Cu | S | H | tert-$C_4H_9$ | H | H | H | — | 0 |
| IV-17 | Pd | O | H | H | tert-$C_4H_9$ | H | H | — | 0 |
| IV-18 | Ni | O | H | H | tert-$C_4H_9$ | H | H | — | |
| IV-19 | Pd | S | H | tert-$C_4H_9$ | H | H | H | — | 0 |
| IV-20 | Ni | S | H | tert-$C_4H_9$ | H | H | H | — | 0 |
| IV-21 | Cu | O | H | tert-$C_4H_9O$ | H | H | H | — | 0 |
| IV-22 | Cu | O | H | iso-$C_3H_7O$ | H | H | H | — | 0 |
| IV-23 | Cu | O | H | sec-$C_4H_9O$ | H | H | H | — | 0 |
| IV-24 | Cu | O | H | 1,2-dimethylpropoxy | H | H | H | — | 0 |
| IV-25 | Cu | O | H | 1,3-dimethylpropoxy | H | H | H | — | 0 |
| IV-26 | Cu | O | H | H | tert-$C_4H_9O$ | H | H | — | 0 |
| IV-27 | Cu | O | H | H | iso-$C_3H_7$ | H | H | — | 0 |
| IV-28 | Cu | O | H | H | sec-$C_4H_9O$ | H | H | — | 0 |
| IV-29 | Cu | O | H | H | iso-$C_4H_9O$ | H | H | — | 0 |
| IV-30 | Cu | O | H | H | 1-iso-propylpropoxy | H | H | — | 0 |
| IV-31 | Cu | O | H | H | 1,2-dimethylbutoxy | H | H | — | 0 |

-continued

Phthalocyanine Dyes Represented by Formula (8)
Dye Nos. IV-1 through IV-46

| Dye No. | M | Y | $R_{31}$ | $R_{32}$ | $R_{33}$ | $R_{34}$ | $R_{35}$ | $R_0$ | r |
|---|---|---|---|---|---|---|---|---|---|
| IV-32 | Cu | O | H | H | neo-$C_6H_{13}$O | H | H | — | 0 |
| IV-33 | Cu | S | H | tert-$C_4H_9$O | H | H | H | — | 0 |
| IV-34 | Cu | S | H | H | tert-$C_4H_9$O | H | H | — | 0 |
| IV-35 | Pd | O | H | tert-$C_4H_9$O | H | H | H | — | 0 |
| IV-36 | Ni | O | H | tert-$C_4H_9$O | H | H | H | — | 0 |
| IV-37 | Pd | O | H | H | tert-$C_4H_9$O | H | H | — | 0 |
| IV-38 | Ni | O | H | H | tert-$C_4H_9$O | H | H | — | 0 |
| IV-39 | Cu | O | H | iso-$C_3H_7$NH— | H | H | H | — | 0 |
| IV-40 | Cu | O | H | H | iso-$C_3H_7$NH— | H | H | — | 0 |
| IV-41 | Cu | O | H | iso-$C_3H_7$S— | H | H | H | — | 0 |
| IV-42 | Cu |   | H | H | iso-$C_3H_7$S— | H | H | — | 0 |
| IV-43 | Cu | O | H | iso-$C_3H_7$NH— | H | H | H | — | 0 |
| IV-44 | Cu | O | H | iso-$C_5H_{11}$ | H | H | H | — | 0 |
| IV-45 | Cu | O | H | H | neo-$C_5H_{11}$ | H | H | — | 0 |
| IV-46 | Cu | O | H | tert-$C_5H_{11}$ | H | H | H | — | 0 |

V-1

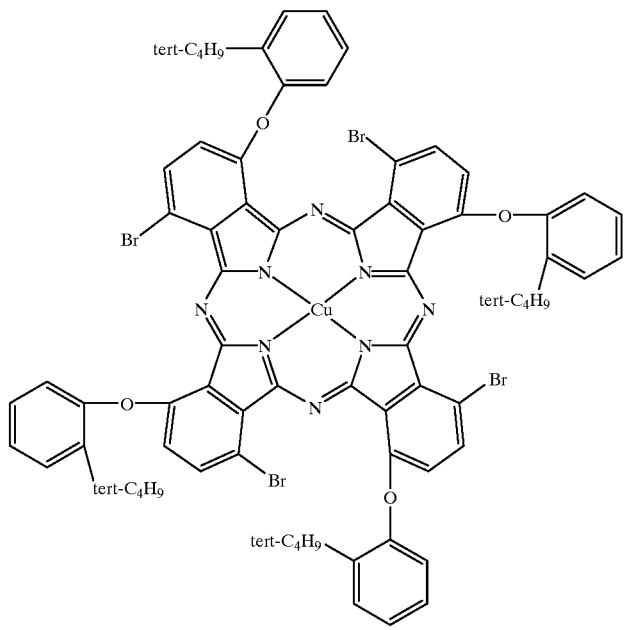

-continued
V-2
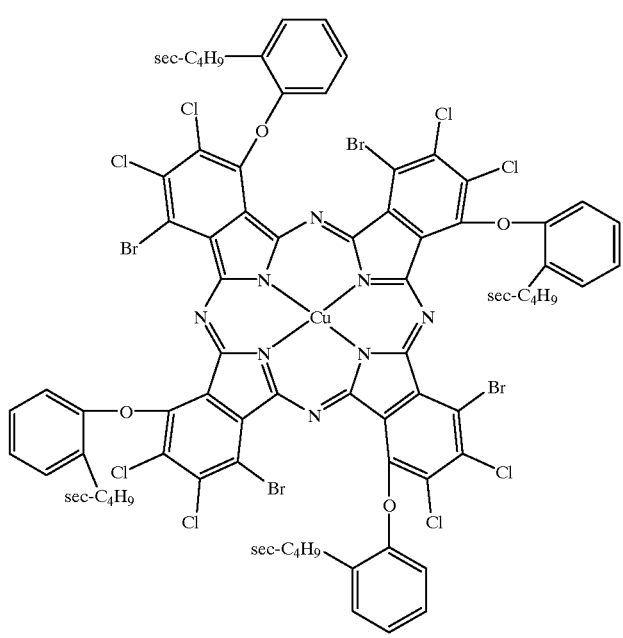
V-3
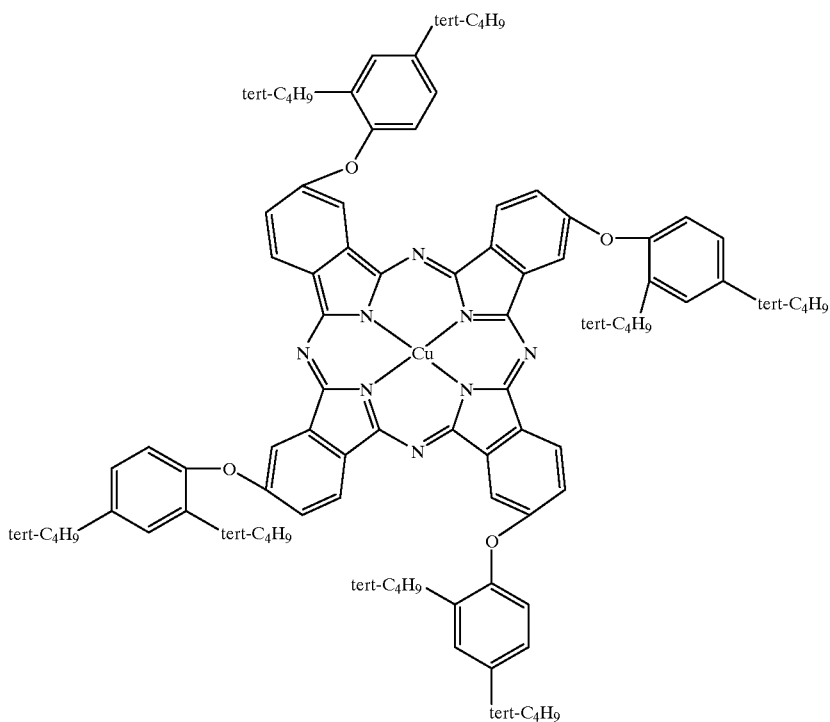

V-4
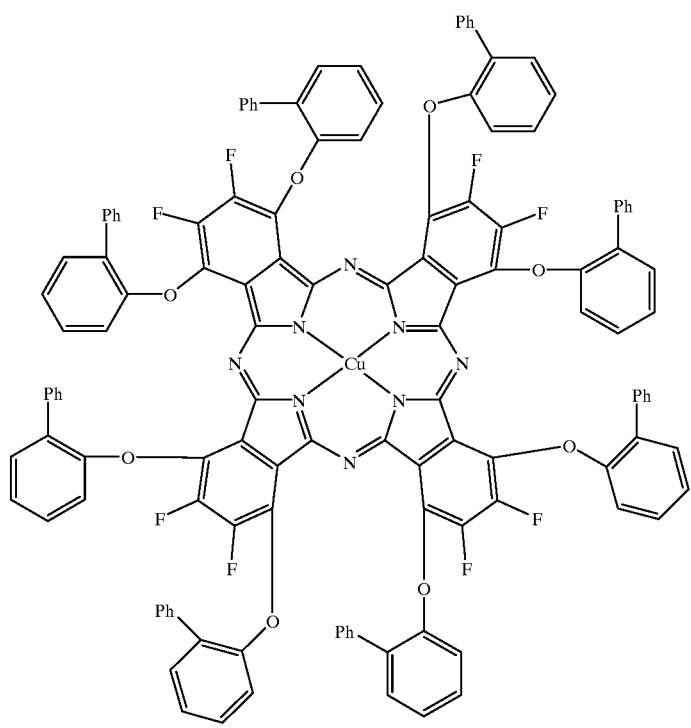
V-5
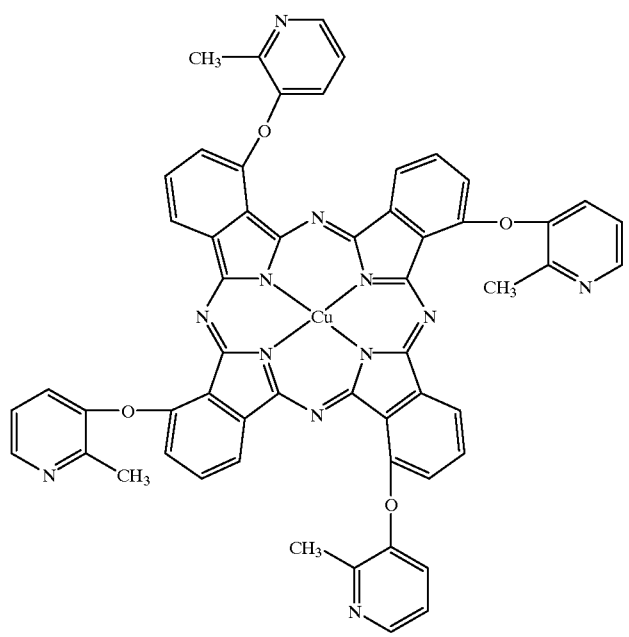

V-6
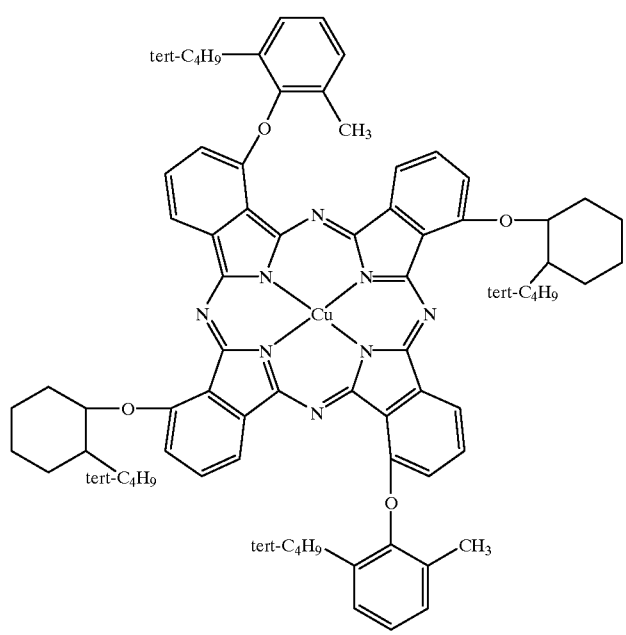
V-7
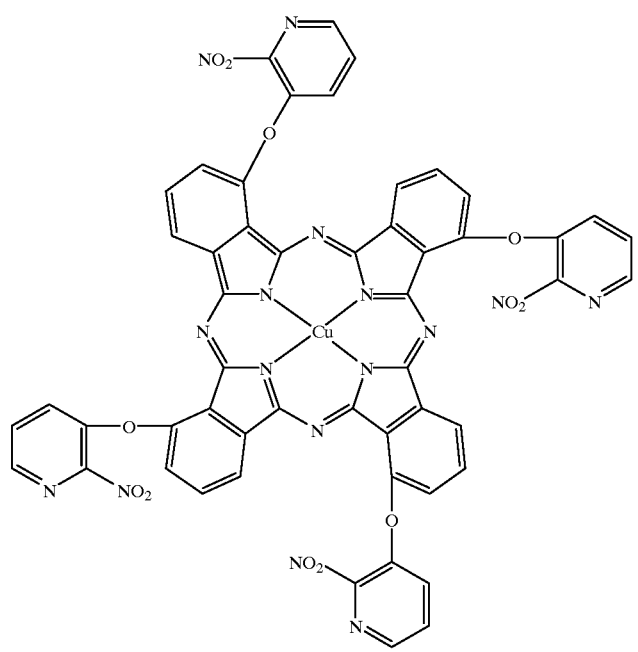

V-8
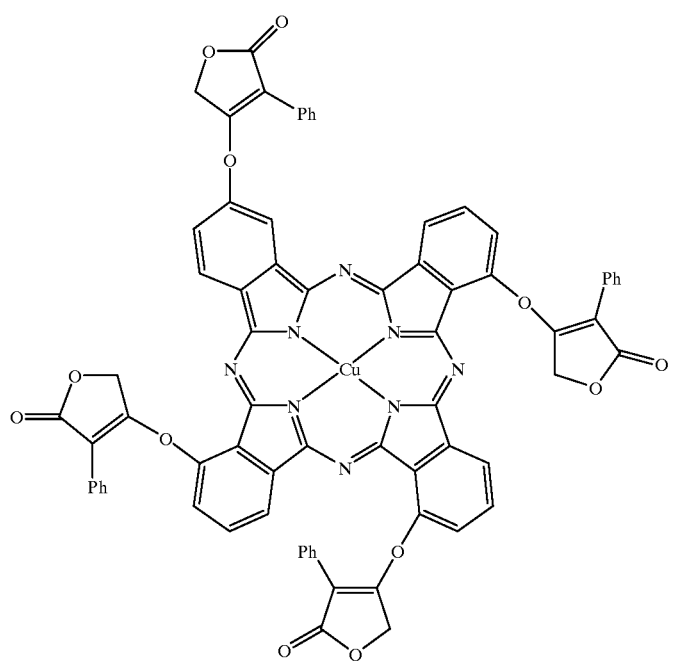
V-9
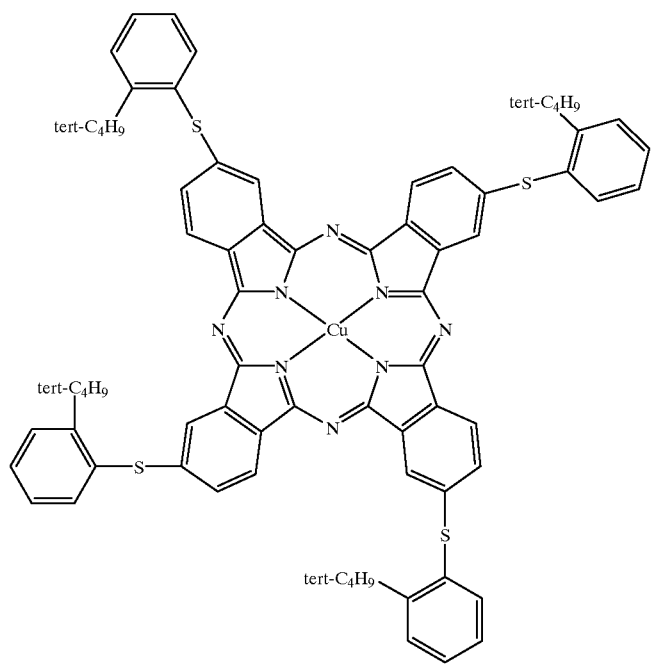

V-10
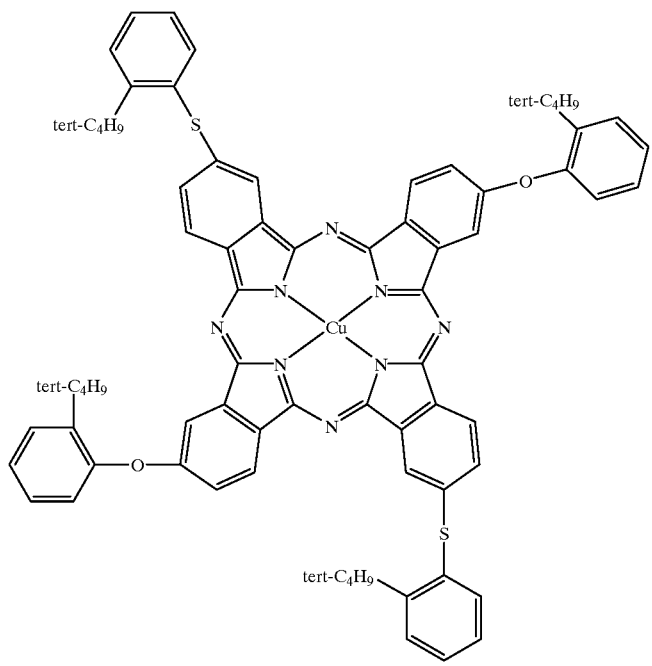
V-11
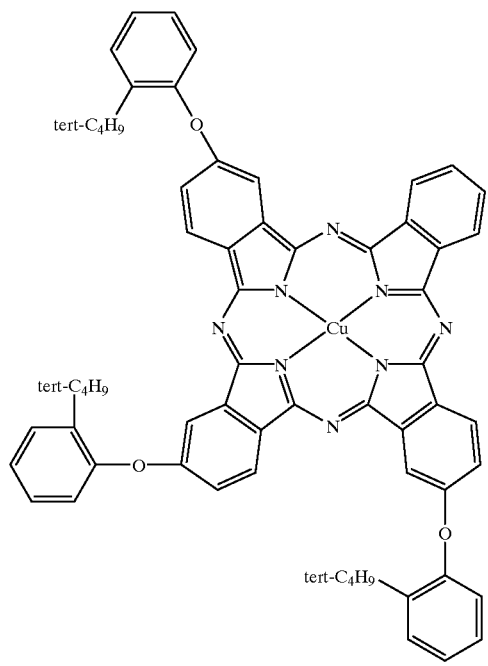

V-12
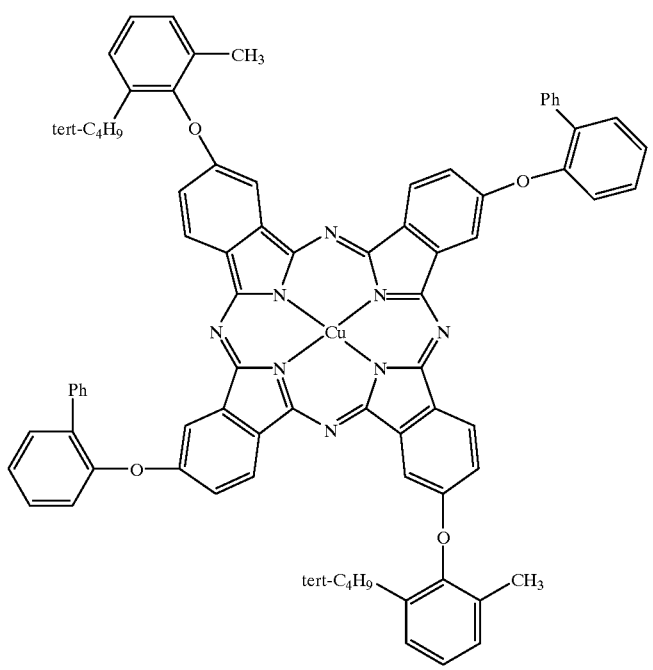
V-13
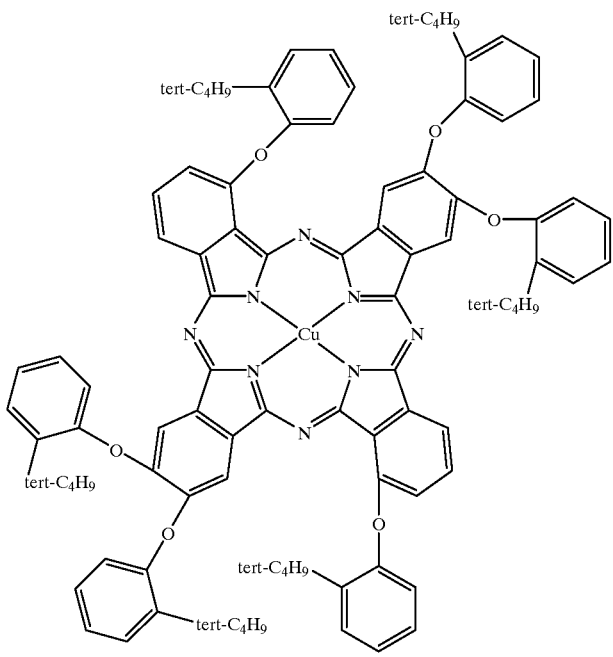

V-14
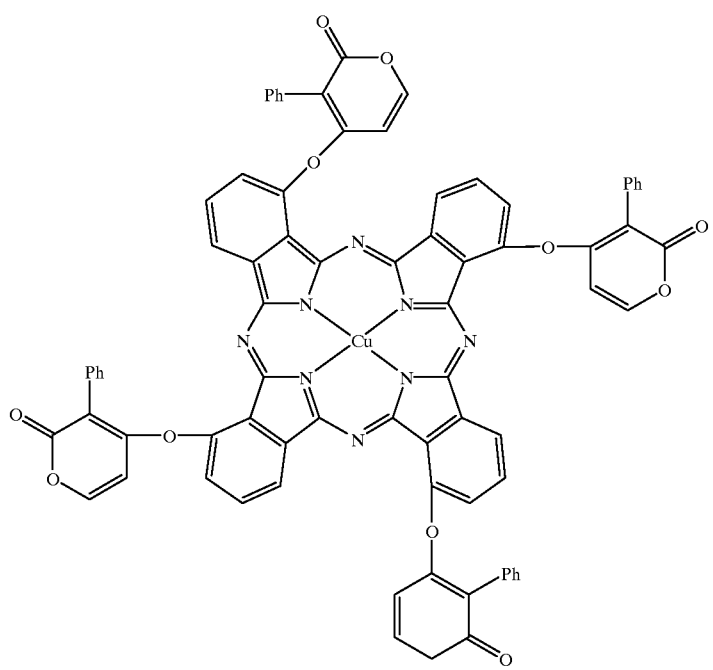
V-15
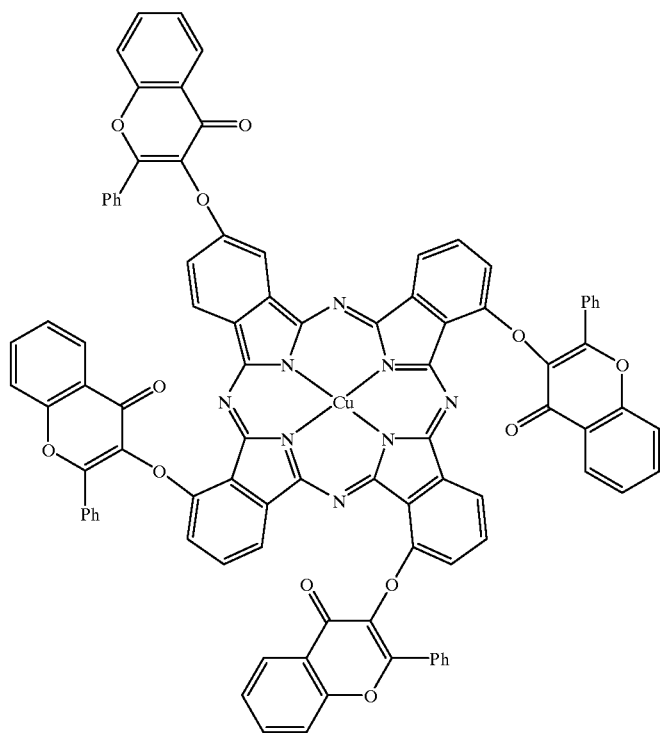

V-16
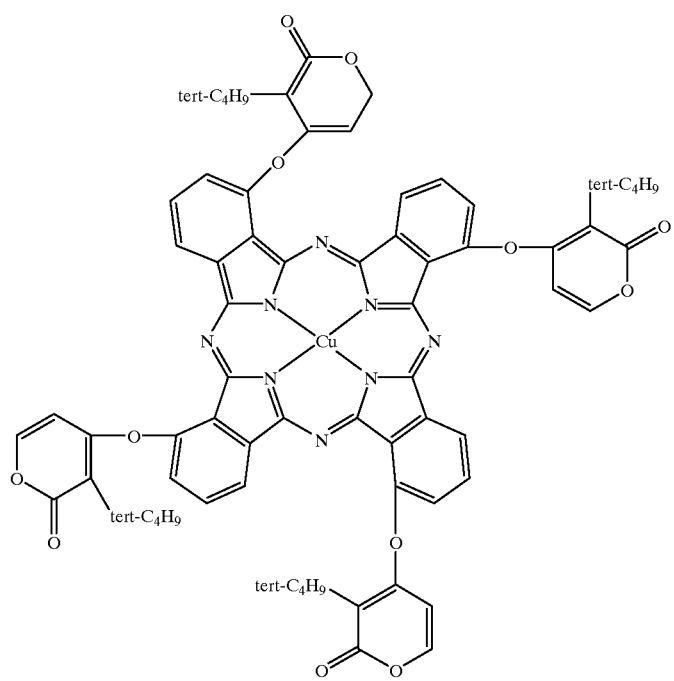
V-17
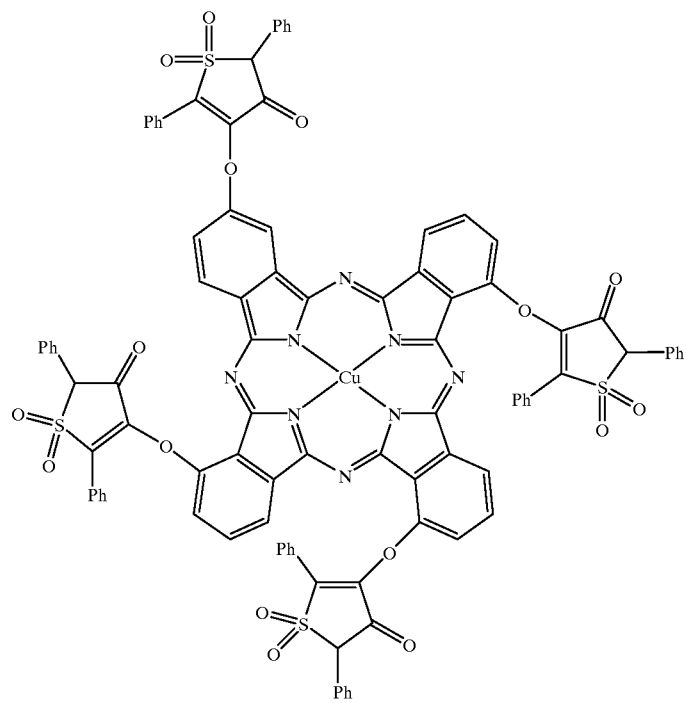

V-17
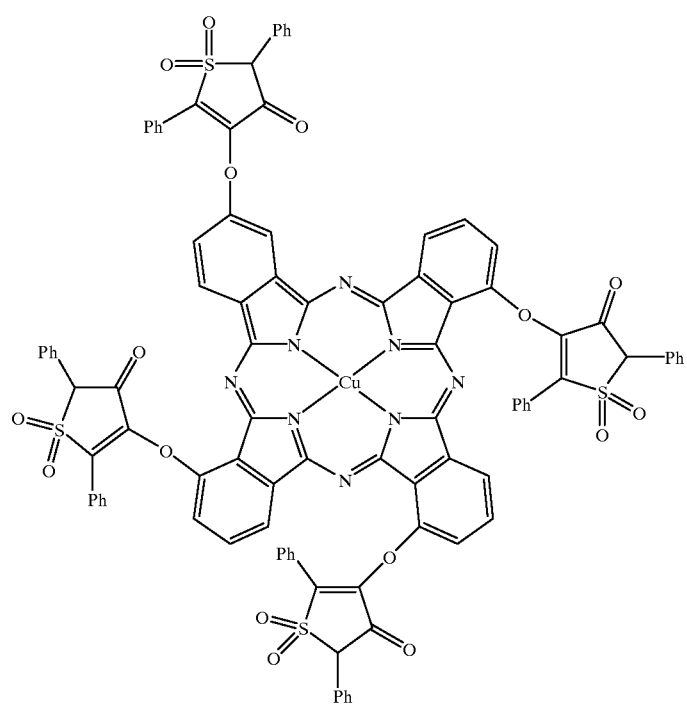
V-18
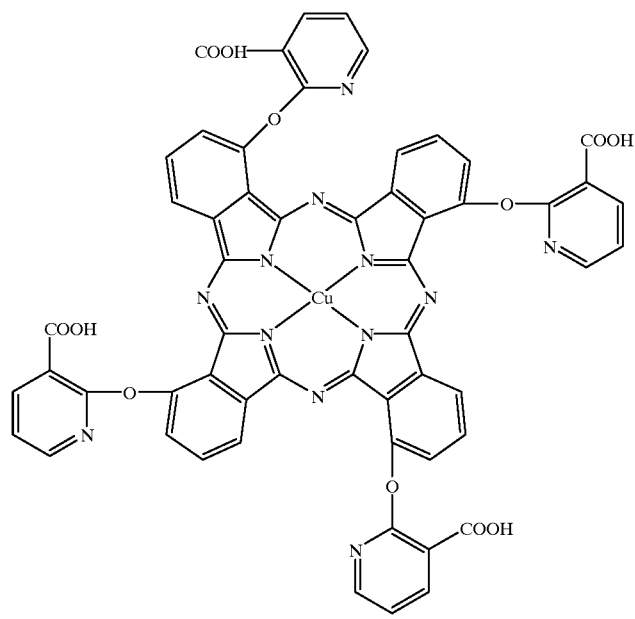

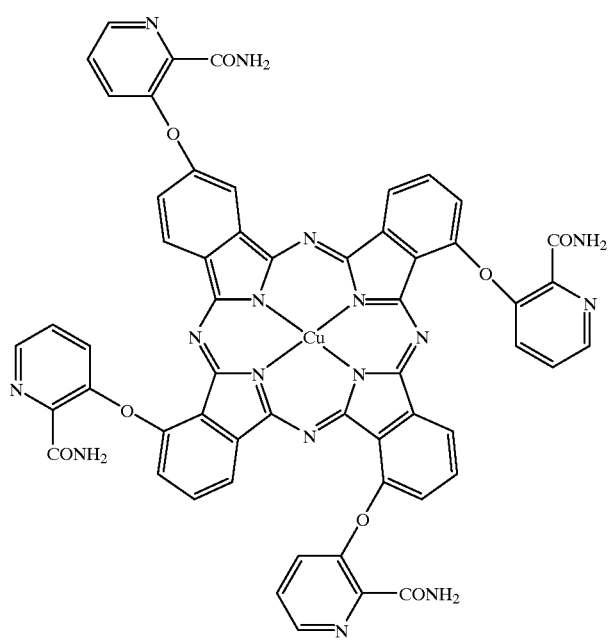
V-19
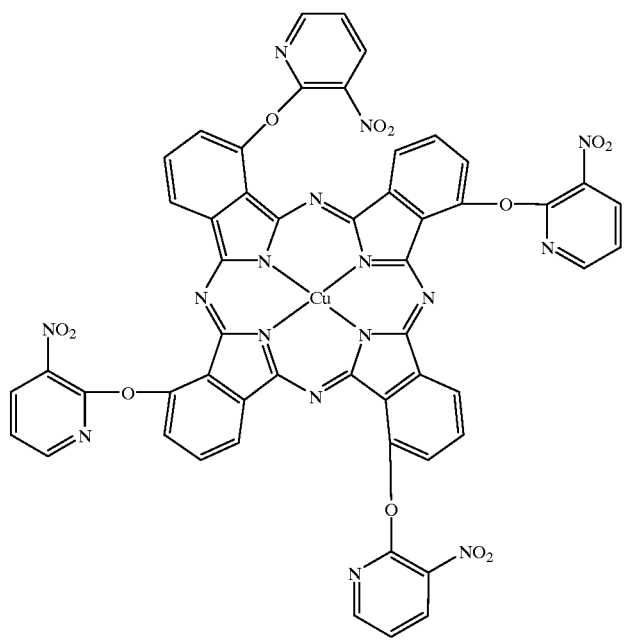
V-20

V-21
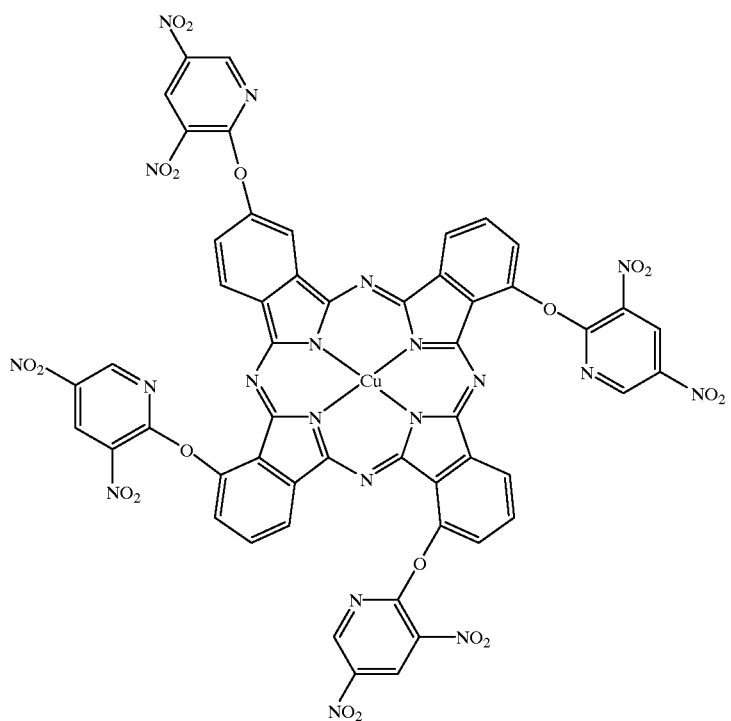
V-22
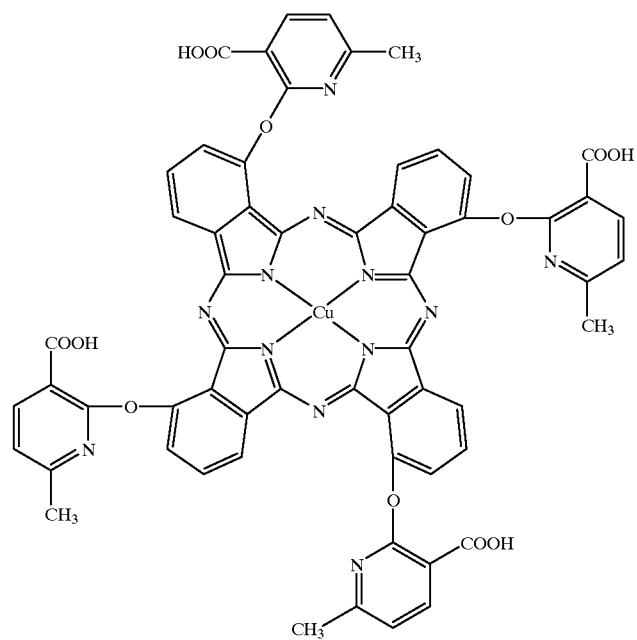

V-23
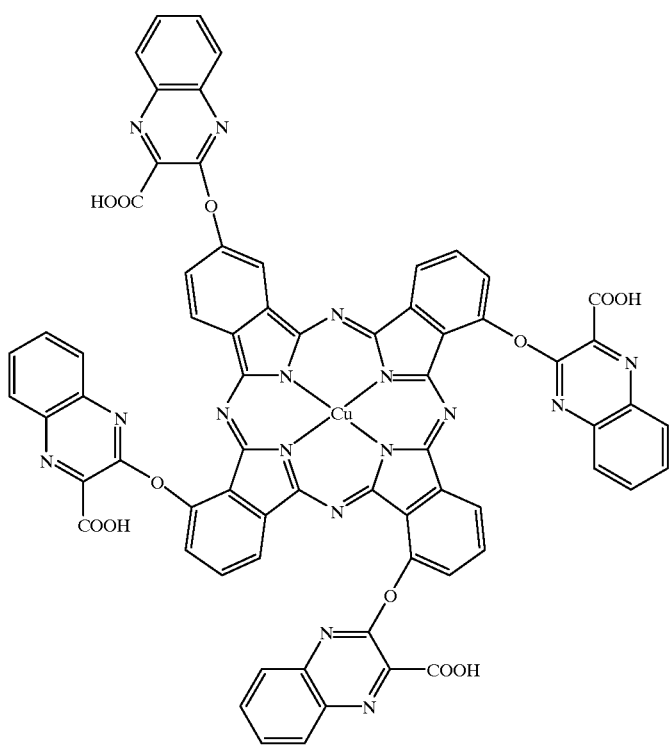
V-24
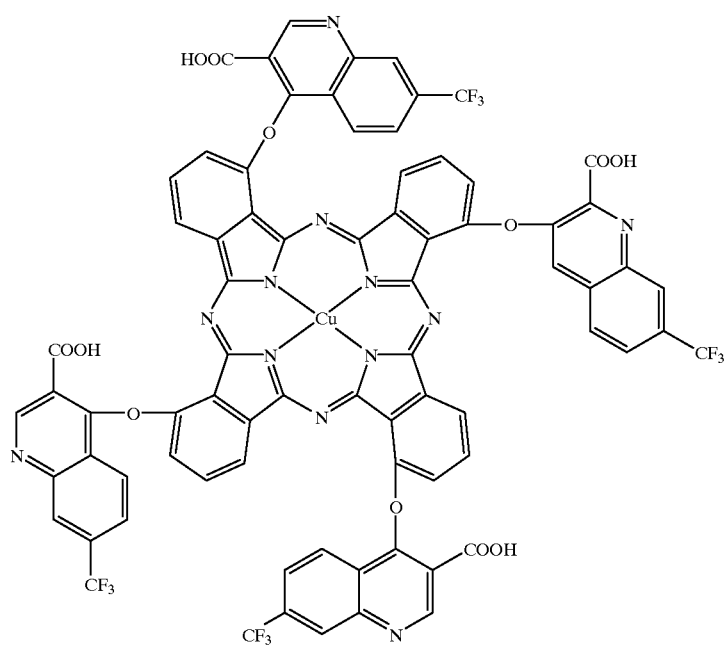

V-25
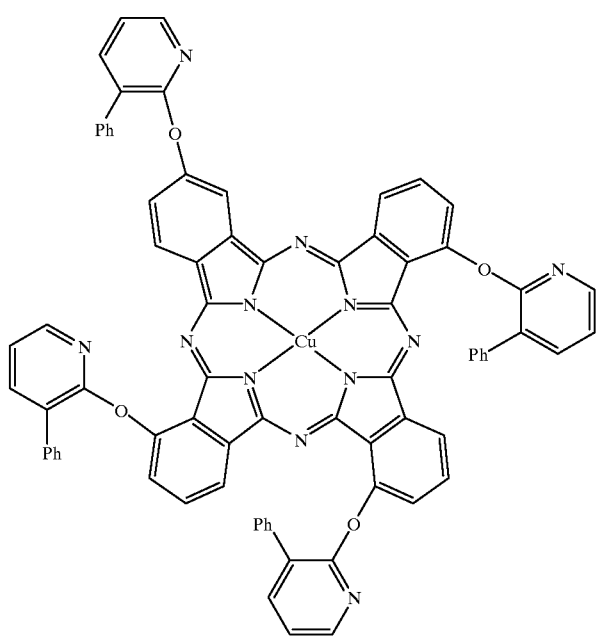
V-26
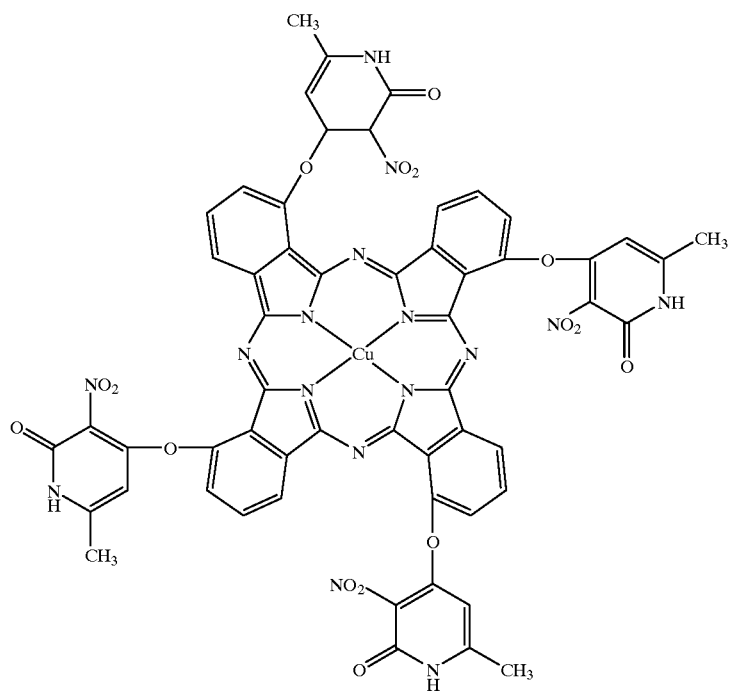

V-27
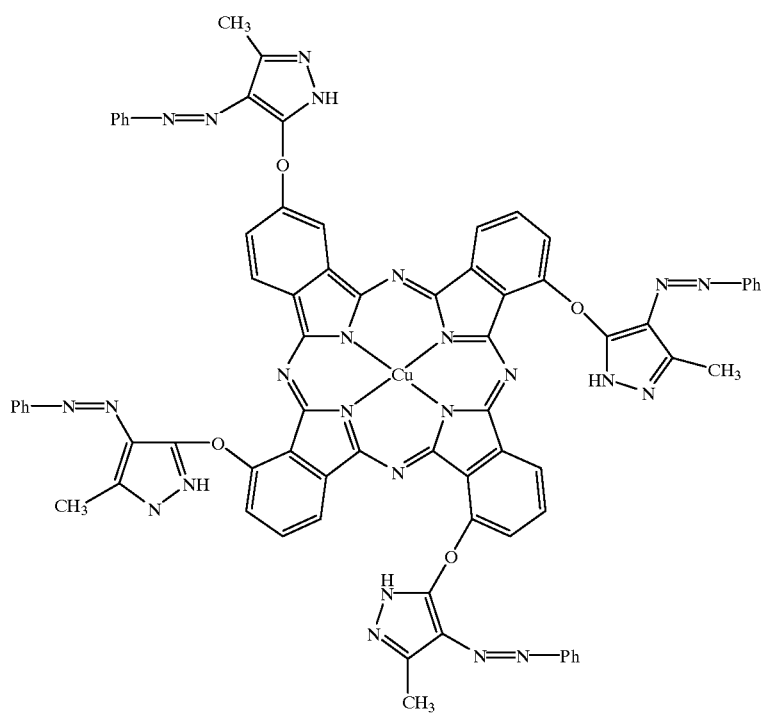
V-28
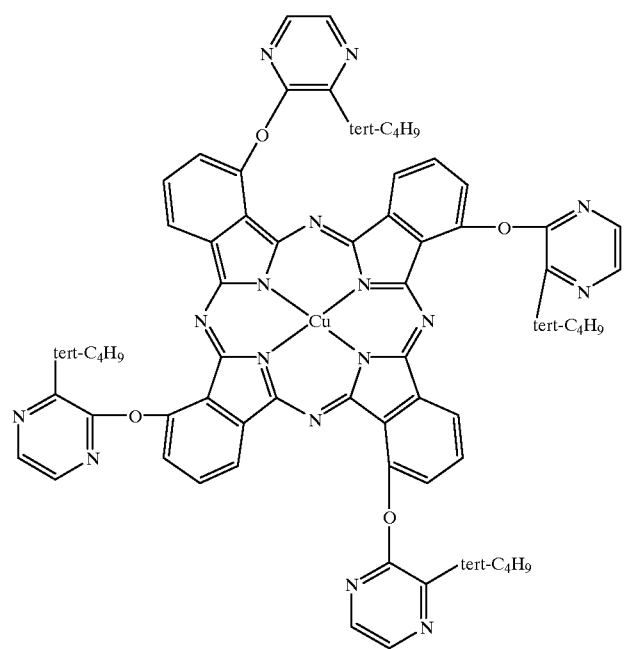

-continued
V-29
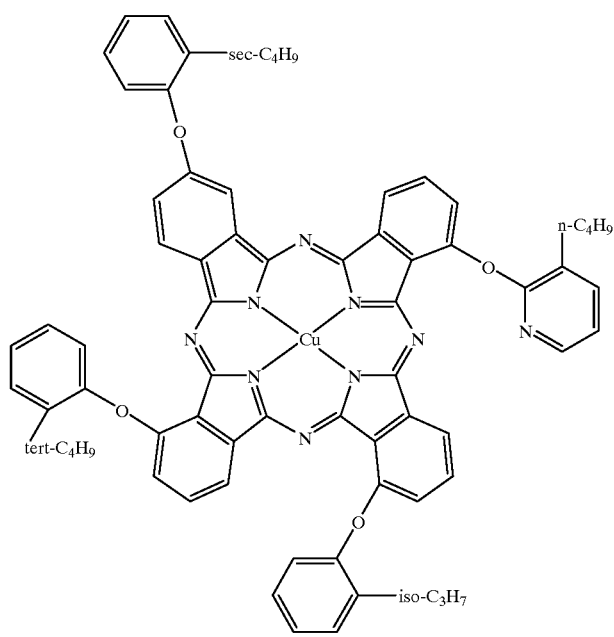
V-30
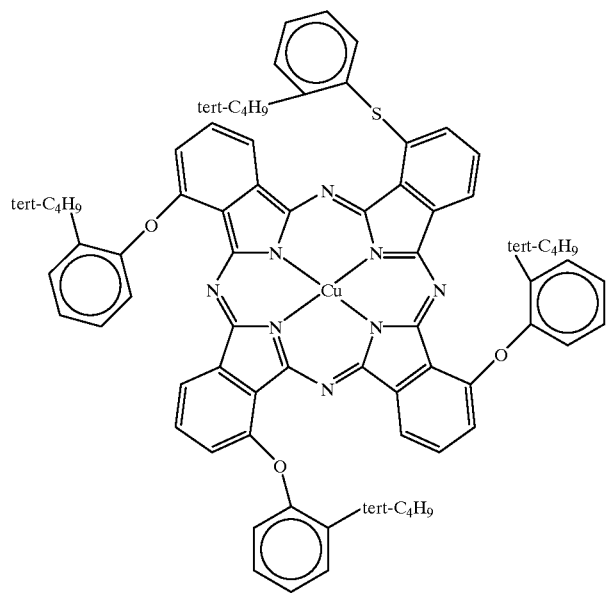

V-31
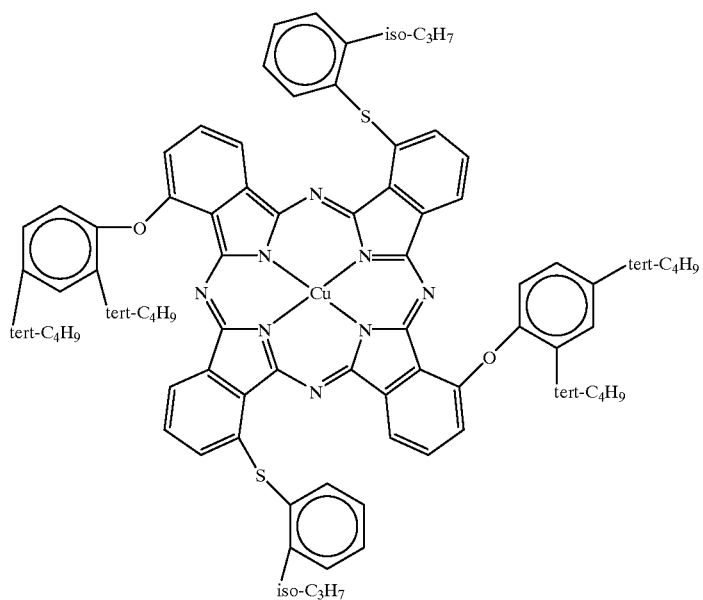
V-32
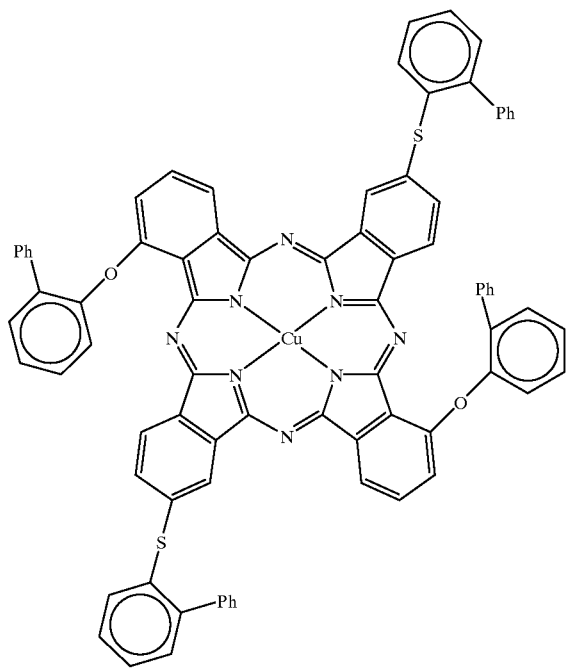

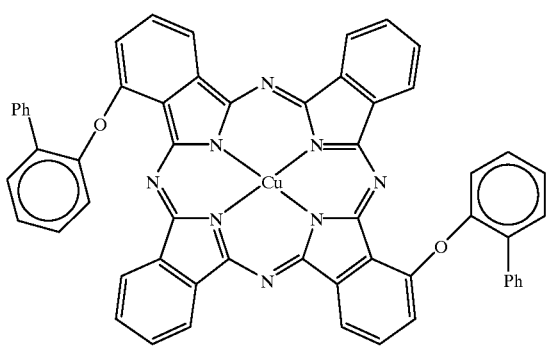
V-33
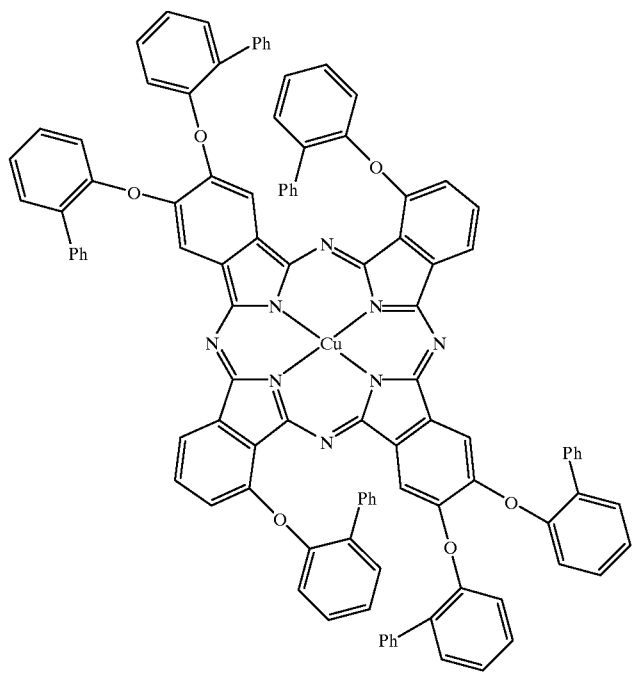
V-34

-continued
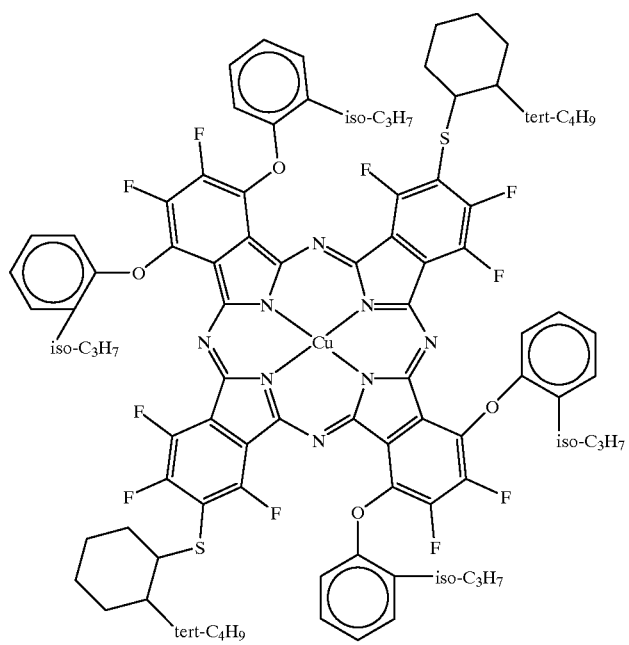
V-35
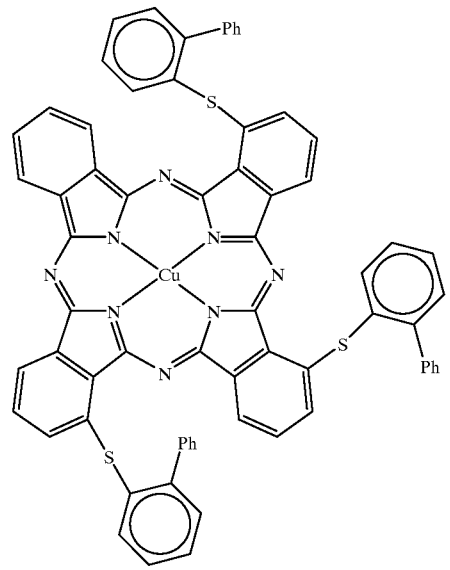
V-36
These compounds include some novel compounds, and may be synthesized in the light of synthesis methods disclosed in JP-A 63-313760, JP-A 63-301261, etc.
Given below are synthesis examples.
SYNTHESIS EXAMPLE 1
Synthesis of Dye No. I-1
Synthesis was done according to the reaction scheme as mentioned just above.
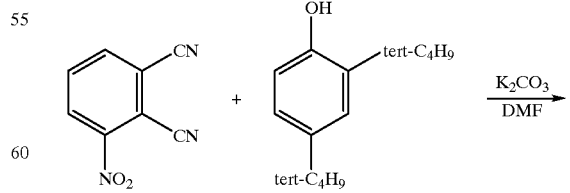

-continued

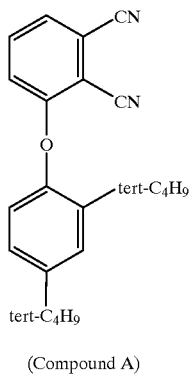

(Compound A)

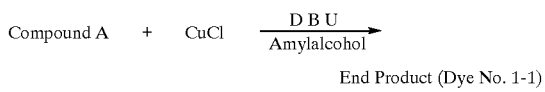

End Product (Dye No. 1-1)

1,2-dicyano-3-nitrobenzene (1.73 g) and 2,4-di-tert-butyl-hydroxybenzene (4.12 g) were allowed to react with each other at 80° C. for 2 hours in dimethylformamide (DMF, 5 ml) with the addition of $K_2CO_3$ (5.0 g). After the completion of the reaction, the reaction product was extracted twice with a mixed solvent of water and ethyl acetate (at a volumetric ratio of 1/1), and the layer extracted with ethyl acetate was dried overnight with the use of $MgSO_4$, followed by removal of ethyl acetate by distillation. The residues were isolated and purified by silica gel column chromatography using chloroform to obtain 2.65 g of 1,2-dicyano-3-(2,3-tert-butylphenyloxy)benzene (compound A) in an 80% yield.

Then, this compound A (1.66 g) and CuCl (0.20 g) were heated under reflux at 200° C. and an amyl alcohol (10 ml) for a 5-hour reaction in the presence of 1,8-diazabicyclo [5.4.0]-7-undecene (DBU, 1.52 g). Following this, the reaction product was isolated by silica gel column chromatography using chloroform to obtain 1.22 g of the end product (yield: 70%, and mp: 285–290° C.).

SYNTHESIS EXAMPLE 2

Synthesis of Dye No. I-2

Dye No. I-2 was obtained following Synthesis Example 1 with the exception that $PdCl_2$ (0.35 g) was used for reaction with compound A in place of CuCl (yield: 70%, and mp: 285–290° C.).

SYNTHESIS EXAMPLE 3

Synthesis of Dye No. II-4

This was synthesized as in Synthesis Example 1.

1,2-dicyano-3-nitrobenzene (1.73 g) and 2-tert-butyl-cyclohexanol (4.68 g) were allowed to react with each other at 80° C. for 2 hours in dimethylformamide (DMF, 5 ml) with the addition of $K_2CO_3$ (5.0 g). After the completion of the reaction, the reaction product was extracted twice with a mixed solvent of water and ethyl acetate (at a volumetric ratio of 1/1), and the layer extracted with ethyl acetate was dried overnight with the use of $MgSO_4$, followed by removal of ethyl acetate by distillation. The residues were isolated and purified by silica gel column chromatography using chloroform to obtain 1.41 g of 1,2-dicyano-2-(tert-butylcyclohexyloxy)benzene in a 50% yield.

Then, this compound (1.41 g) and CuCl (0.14 g) were heated under reflux at 200° C. and in amyl alcohol (10 ml) for a 5-hour reaction in the presence of 1,8-diazabicyclo [5.4.0]-7-undecene (DBU, 0.76 g). Following this, the reaction product was isolated by silica gel column chromatography using chloroform to obtain 0.97 g of the end product (yield: 65%, and mp: 220–222° C.).

SYNTHESIS EXAMPLE 4

Synthesis of Dye No. III-1

This was synthesized as in Synthesis Example 1.

1,2-dicyano-3-nitrobenzene (1.73 g) and 3-tert-butyl-hydroxybenzene (4.50 g) were allowed to react with each other at 80° C. for 2 hours in dimethylformamide (DMF, 5 ml) with the addition of $K_2CO_3$ (5.0 g). After the completion of the reaction, the reaction product was extracted twice with a mixed solvent of water and ethyl acetate (at a volumetric ratio of 1/1), and the layer extracted with ethyl acetate was dried overnight with the use of $MgSO_4$, followed by removal of ethyl acetate by distillation. The residues were isolated and purified by silica gel column chromatography using chloroform to obtain 2.21 g of 1,2-dicyano-3-(3-tert-butylphenyloxy) benzene in a 80% yield.

Then, this compound (1.38 g) and CuCl (0.12 g) were heated under reflux at 200° C. and in amyl alcohol (10 ml) for a 5-hour reaction in the presence of 1,8-diazabicyclo [5.4.0]-7-undecene (DBU, 0.76 g). Following this, the reaction product was isolated by silica gel column chromatography using chloroform to obtain 0.95 g of the end product (yield; 70%, and mp: 230°–232° C.).

Many other dyes were synthesized as mentioned above, or in accordance with the above-mentioned synthesis procedure (yield: about 45 to about 80%).

These dyes may be identified by elementary analysis visible light absorption spectra, infrared absorption spectra, mass spectra, nuclear magnetic resonance absorption spectra, etc.

These dyes have a melting point (mp) of 60 to 300° C. and a λmax value lysin within the range of 600 to 800 nm (as measured in toluene).

The phthalocyanine dyes of this invention are improved in solubility over conventional phthalocyanine dyes. The solubility of the dye according to formula (2) in ethylene glycol monoethyl ether (ethyl cellosolve), for instance, is at least 18% by weight, often at least 3% by weight (as measured at 25° C.) in sharp contrast to a so-far-achieved solubility of at most about 0.5% by weight and often about 0% by weight. The upper limit of the solubility of the dye of formula (2) in the above-mentioned solvent is about 10% by weight; that is, this dye has a solubility lying within the range of 1 to 10% by weight. The solubility of the dye according to formula (6) in ethylcyclohexanone, for instance, is at least 1% by weight, often at least 2% by weight (as measured at 25° C.). It is here to be noted that the upper limit of the solubility of the dye of formula (6) in the above-mentioned solvent is about 10% by weight; that is, this dye has a solubility lying within the range of 1 to 10% by weight. JP-A 5-25179 discloses halogenated alkoxyphthalo-cyanine as a phthalocyanine dye with an improved solubility in an aliphatic hydrocarbon solvent. However, the yield of this compound is very low because much difficulty is involved in synthesis. However, the dye according to formula (6) can be synthesized in a relatively easy manner.

Use of the dyes according to formulae (2) and (6), therefore, makes it easy to prepare a coating solution, because they have a high-enough solubility with respect to a coating solvent unlikely to attack polycarbonate resin (PC)

generally used as the substrate material for optical recording media. It is thus possible to form a dye film of sufficient thickness. Moreover, it is possible to achieve a dye film of good quality because of no deposition of precipitates on the film, which are often found when a coating solution of insufficient solubility is used.

Preferably, the dyes of this invention are applied to the recording layer of an optical recording medium, especially, an optical recording disk of the write-once type (CD-R). In this case, the dyes may be used alone or in combination of two or more. Such a recording layer is preferably provided with the use of a dye-containing coating solution, especially, by a spin coating process in which a coating solution is coated over a rotating substrate.

The coating solvent used may then be selected from alcohol solvents (including keto-alcohols and ethylene glycol monoalkyl ethers), aliphatic hydrocarbon solvents, ketone solvents, ester solvents, ether solvents, aromatic solvents, halogenated alkyl solvents, and other suitable solvents.

Preferred among these are alcohol and aliphatic hydrocarbon solvents. Preferable alcohol solvents are keto-alcohols such as diacetone alcohol, and ethylene glycol monoalkyl ethers (cellosolves) such as ethylene glycol monomethyl ether (methyl cellosolve), ethylene glycol monoethyl ether (ethyl cellosolve) and butyl cellosolve. Particularly preferable are ethylene glycol monoalkyl ethers, among which ethylene glycol monoethyl ether is most preferred. These coating solvents have a vapor pressure of up to 10.0 mmHg, usually 0.5 to 10.0 mmHg at 25° C. For the aliphatic hydrocarbon solvents, for instance, preference is given to n-hexane, cyclohexane, methylcyclohexane, ethyl-cyclohexane, cyclooctane, dimethylcyclohexane, n-octane, isopropylcyclohexane and t-butylcyclohexane, among which ethylcyclcohexane and dimethylcyclohexane are most preferable. These aliphatic hydrocarbon solvents have a vapor pressure of about 200 mmHg, usually about 0.5 to about 200 mmHg at 20° C. In general, an aliphatic hydrocarbon solvent has the property of being likely to evaporate and becoming poor in affinity for water, as its vapor pressure increases.

After such spin coating as mentioned above has been completed, the film is dried, if required. The thus formed recording layer has usually a thickness of about 1,000 to about 3,000 Å, although it may be determined depending on the desired reflectivity, etc.

It is here to be understood that the dye content of the coating solution is preferably 2 to 10% by weight, and the coating solution may optionally contain binders, dispersants, stabilizers, and other additives.

One embodiment of the optical recording disk in which the substrate includes thereon such a dye film in the form of a recording layer is schematically illustrated in FIG. 1. FIG. 1 is a sectional view of part of that embodiment. As shown in FIG. 1, an optical recording disk generally shown at 1 is a close contact type of optical recording disk which has a recording layer and a reflective layer disposed in close contact therewith and enables reproduction according to the CD standard. As illustrated, the optical recording disk 1 includes a recording layer 3 composed predominantly of such a dye as mentioned above, which is formed on the surface of a substrate 2, a reflective layer 4 in close contact with the recording layer 3, and a protective layer 5.

The substrate 2 is in a disk form and, to enable recording and reproduction from the back surface of the substrate, is preferably formed of a resin or glass material which is substantially transparent to recording and reproduction light, typically semiconductor laser light having a wavelength of about 600 nm to about 900 nm, especially about 770 nm to about 900 nm, most often 780 nm or, in another parlance, has a transmittance of at least 88%. The disk has a diameter of about 64 mm to about 200 mm and a thickness of about 1.2 mm.

On the surface of the substrate 2 where the recording layer 3 is formed, a groove 23 is formed for tracking purposes, as shown in FIG. 1. The groove 23 is preferably a continuous spiral groove having a depth of 0.1 to 0.25 μm, a width of 0.35 to 0.50 μm and a groove pitch of 1.5 to 1.7 μm. Such groove configuration enables good-enough tracking signals to be obtained without a lowering of the reflection level of the groove area. It is particularly important to limit groove width to 0.35 to 0.50 μm. A groove width less than 0.35 μm makes it difficult to obtain tracking signals of sufficient magnitude, resulting in an increased jitter even when tracking is slightly offset during recording. At wider than 0.50 μm, an increased crosstalk is likely to occur for the reason of the waveform distortion of reproduction signals.

The substrate 2 is preferably formed of resins, typically thermoplastic resins such as polycarbonate resins, acrylic resins, amorphous polyolefins, TPX and polystyrene resins, using conventional molding techniques such as injection molding. Preferably, the groove 23 should be formed simultaneously with the molding of the substrate 2. Alternatively, a resin layer having the groove 23 may be formed by 2P or other methods after the fabrication of the substrate 2. Still alternatively, the substrate may be formed of a glass material.

The recording layer 3 provided on the substrate 2, as shown in FIG. 1, has been formed by the spin coating of the above-mentioned dye-containing coating solution. Spin coating may be carried out according to conventional conditions, while the peripheral speed of rotation of the substrate is varied between 500 rpm and 5,000 rpm.

Preferably, the thus formed recording layer 3 has an as-dried thickness of 500 to 3,000 Å or 50 to 300 nm. A departure from this range gives rise to a reflectivity drop, rendering reproduction conforming to the CD standard difficult. A very high degree of modulation is then obtained, if the thickness of the tracking area of the recording layer 3 within the groove 23 is kept at 1,000 Å or 100 nm or more, especially, at 1,300 to 3,000 Å or 130 to 300 nm.

For recording CD signals on the thus formed recording layer 3, it is preferable that the coefficient of extinction (the imaginary part of a complex index of refraction) is k=0.02 to 0.05 at the wavelength of recording and reproduction light. At k<0.02 the absorptivity of the recording layer becomes too low for recording with ordinary recording power. At k>0.05 the reflectivity becomes lower than 70%, rendering reproduction conforming to the CD standard difficult. Moreover, the index of refraction (the real part of a complex index of refraction) of the recording layer 3 is n=2.0 to 2.6. At n<2.0 the reflectivity and signal output are reduced, rendering reproduction conforming to the CD standard difficult. Dyes with n<2.6 are little available.

In determining n and k of a recording layer, a sample is prepared by forming a recording layer on a given transparent substrate to a thickness of about 40 nm to about 100 nm under practical conditions. Then, the reflectivity of the sample is measured either through the substrate or from the recording layer side. Reflectivity is measured in a specular reflection mode (of the order of 5') using light of the recording/reproducing wavelength. The transmittance of the sample is also measured. The values of n and k may be calculated from these measurements according to Ishiguro Kozo, "Optics", Kyoritsu Publishing K.K., pp. 168–178.

As can be seen from FIG. 1, the reflective layer 4 is provided on the recording layer 3 in direct contact relation thereto. Preferably, the reflective layer 4 is formed of a high-reflectivity metal or alloy such as Au and Cu or their alloy. The reflective layer 4 has preferably a thickness of at least 500 Å, and may be formed as by evaporation, and sputtering. The upper limit of thickness is not critical, although it is preferably about 1,200 Å or less when cost, production time and other factors are taken into account. The reflective layer itself has thus a reflectivity of at least 90%; so the reflectivity of an unrecorded area of the optical recording disk through the substrate can be at least 60%, especially at least 70%.

As can be seen from FIG. 1, the protective layer 5 is formed on the reflective layer 4. The protective layer 5 is formed of various resin materials such as UV curable resins, for instance, and may have usually a thickness of about 0.5 µm to about 100 µm. The protective layer 5 may be in a layer or sheet form. The protective layer 5 may be formed by conventional processes such as spin coating, gravure coating, spray coating and dipping.

Recording or additional recording may be carried out on the optical recording disk 1 of such construction by directing recording light having a wavelength of 780 nm, for example, in pulse form to the recording layer 3 through the substrate 2 to form an irradiated or recorded spot where optical reflectivity has changed. The recording layer 3 absorbs light so that it is heated while the substrate 2 is heated at the same time. As a result, the materials of the recording layer such as the dye melt or decompose in the vicinity of the interface between the substrate 2 and the recording layer 3, probably applying pressure to that interface to deform the bottom and side walls of the groove. On recording, the substrate is rotated at a linear velocity of about 1.2 m/s to about 1.4 m/s.

This invention is applicable not only to a close contact type of optical recording medium such as one shown but also to every optical recording medium having a dye-containing recording layer. Typical of such a medium is an air sandwich pit type of optical recording disk. By application of this invention to such a disk it is possible to achieve similar benefits.

EXAMPLE

This invention will now be explained at great length with reference to specific examples of the invention and comparative examples.

Example 1

The phthalocyanine dyes represented by formula (2) were determined in terms of melting point (mp), λmax (in toluene) and solubility (at 25° C.) in ethyl cellosolve (having a vapor pressure of 3.8 mmHg at 20° C.). Typical results are enumerated in Tables 1 and 2.

TABLE 1

| Dye No. | λ max/nm (in toluene) | mp/° C. | Solubility (in ethyl cellosolve)/wt % |
|---|---|---|---|
| I-1 | 705.5 | 285–290 | 4 |
| I-2 | 689.0 | 285–290 | 4 |
| I-3 | 704.0 | 270–273 | 3 |

TABLE 1-continued

| Dye No. | λ max/nm (in toluene) | mp/° C. | Solubility (in ethyl cellosolve)/wt % |
|---|---|---|---|
| I-4 | 703.5 | 280–285 | 3 |
| I-5 | 687.5 | 267–270 | 3 |
| I-6 | 700.5 | 165–170 | 3 |
| I-7 | 693.0 | 225–230 | 3 |
| I-8 | 697.5 | 210–220 | 1 |
| I-9 | 703.5 | 252–255 | 3 |
| I-10 | 705.0 | 260–265 | 3 |
| I-11 | 702.0 | 227–229 | 3 |
| I-12 | 705.0 | 272–274 | 4 |
| I-13 | 700.5 | 240–250 | 4 |
| I-14 | 684.5 | 240–245 | 4 |
| I-15 | 695.5 | 210–215 | 1.5 |
| I-16 | 683.0 | 125–130 | 1 |
| I-17 | 694.0 | 230–237 | 1 |
| I-18 | 689.0 | 210–212 | 1 |
| I-31 | 700.0 | 170–175 | 3 |
| I-32 | 700.0 | 189–195 | 2.5 |
| I-33 | 718.0 | 212–214 | 2 |
| I-34 | 720.0 | 250–256 | 3 |
| I-35 | 705.0 | 241–243 | 3 |
| I-36 | 705.0 | 231–232 | 5 |
| I-37 | 697.0 | 250–257 | 4 |
| I-38 | 691.5 | 140–141 | 1 |
| I-39 | 691.0 | 220–225 | 2 |
| I-40 | 700.5 | 202–205 | 2 |

TABLE 2

| Dye No. | λmax/nm (in toluene) | mp/° C. | Solubility (in ethyl cellosolve)/wt % |
|---|---|---|---|
| V-1 | 703.5 | 123–125 | 3 |
| V-2 | 702.0 | 191–193 | 3 |
| V-3 | 700.0 | 154–156 | 4 |
| V-4 | 703.0 | 228–234 | 1.5 |
| V-5 | 700.0 | 291–295 | 1 |
| II-1 | 705.5 | 231–232 | 4 |
| II-2 | 689.0 | 227–230 | 4 |
| II-3 | 704.0 | 211–215 | 3 |
| II-4 | 703.5 | 220–222 | 3 |
| II-5 | 687.5 | 252–257 | 3 |
| II-9 | 703.5 | 221–223 | 3.5 |

For the purpose of comparison, dyes (a), (b) and (b) were determined in terms of solubility (at 25° C.) in ethyl cellosolve. As a result, their solubility was found to be virtually 0% by weight.

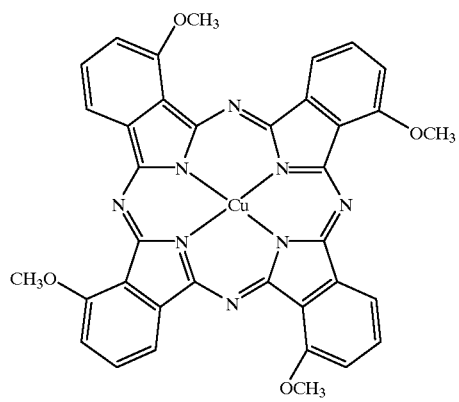

a

-continued

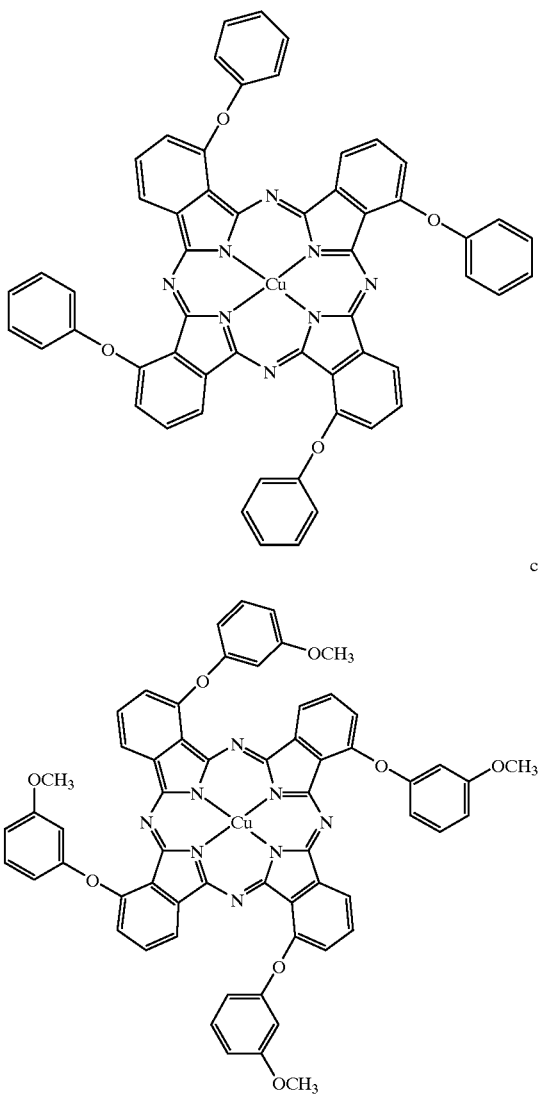

These results reveal that the dyes of the invention are all improved in terms of solubility, and teach that the effect on the increased solubility is due to the substituent present adjacent to the site of the phenoxy group to which O or S is attached.

Example 2

Using a 4% by weight ethyl cellosolve solution of Dye No. I-1 of the exemplified dyes, a dye film was formed on a 1.2-mm thick polycarbonate substrate by spin coating. The absorption and reflection spectra of the thin-film sample were measured. The as-dried thickness of the dye film was 200 nm. The results are plotted in FIG. 2.

Figure 2:
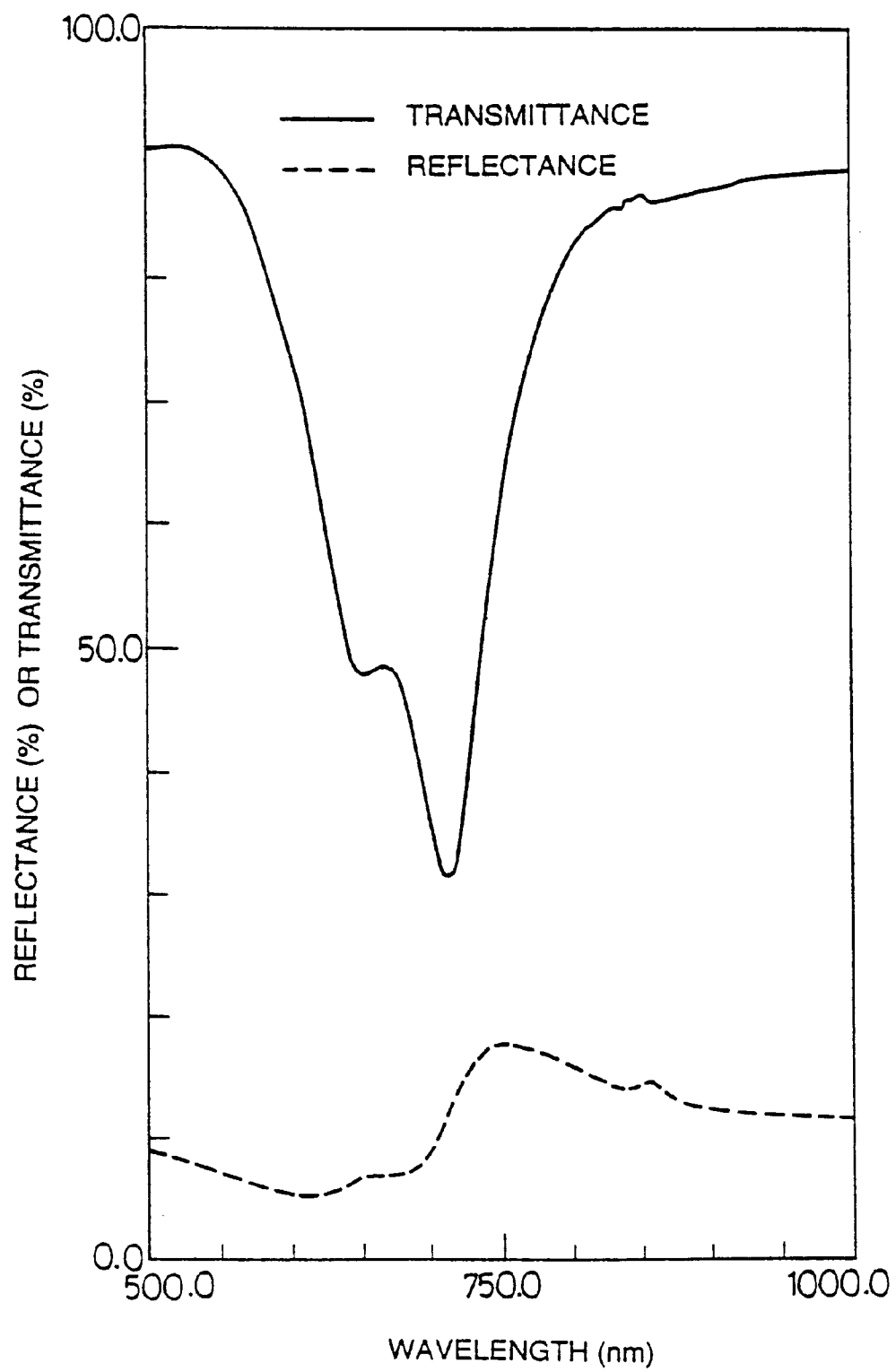
FIG. 2 is a graph showing the absorption and reflection spectra of one embodiment of the thin film of the phthalocyanine dye according to this invention.

From FIG. 2, it is found that Dye No. I-1 has a reduced absorptivity and a certain or higher reflectivity in the vicinity of the wavelength (780 nm) of semiconductor laser. In other words, this dye is found to be well fit for the recording layer of an optical recording medium with which semiconductor laser is used.

Further, the absorption and reflection spectra of Dye No. I-2 were measured. Similar results were obtained.

Example 3

Polycarbonate was injection molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,550 Å. Using a 4% by weight ethyl cellosolve solution of Dye No. I-1, a dye film was spin coated on the resin substrate to obtain a recording layer. The as-dried thickness of the recording layer was 1,500 Å in the groove and 1,200 Å on the average. The recording layer was then formed thereon with an 85-nm thick Au reflective layer by sputtering, on which an ultraviolet-curing type of acrylic resin was formed to obtain a protective layer of 5 μm in thickness. In this way, an optical recording disk shown in FIG. 1 was obtained.

This sample will hereinafter be called Disk Sample No. 1.

Using 780-nm semiconductor layer, the recording characteristics of Disk Sample No. 1 were determined at a linear velocity of 1.4 m/s; it was found that the optimal recording power is 7.3 mW while the reflectivity, the degree of modulation and Rtop were found to be at least 70%, at least 60% and 65%, respectively. In other words, this disk is found to be an optical recording disk conforming to the Orange Gook standard.

Example 4

Disk Sample No. 2 was obtained following Example 3 with the exception that Dye No. I-2 was used instead of Dye No. I-1. Dye film formation was carried out using a 4% by weight ethyl cellosolve solution.

As in Example 3, the recording the reproduction characteristics of Disk Sample No. 2 were determined. It was then found that the optimal recording power is 7.0 mW, with a reflectivity of at least 70%, a degree of modulation of at least 60% and an Rtop value of 69%; this was found to conform to the Orange Book standard.

Example 5

An optical recording disk was obtained following Example 3 with the exception that Dye No. I-13 was used instead of Dye No. I-1. A 4% by weight ethyl cellosolve solution of the dye was used for dye film formation. This disk will hereinafter be called Disk Sample No. 3.

As in Example 3, the recording the reproduction characteristics of Disk Sample No. 3 were determined.

It was then found that the optimal recording power is 6.5 mW, with a reflectivity of at least 70%, a degree of modulation of at least 60% and an Rtop value of 67%; this was found to conform to the Orange Book standard.

Example 6

An optical recording disk was obtained following Example 3 with the exception that Dye No. I-14 was used instead of Dye No. I-1. A 4% by weight ethyl cellosolve solution of the dye was used for dye film formation. This disk will hereinafter be called Disk Sample No. 4.

As in Example 3, the recording and reproduction characteristics of Disk Sample No. 4 were determined.

It was then found that the optimal recording power is 6.5 mW, with a reflectivity of at least 70%, a degree of modulation of at least 60% and an Rtop value of 70%; this was found to conform to the Orange Book standard.

Example 7

An optical recording disk was obtained following Example 3 with the exception that Dye No. II-1 was used instead of Dye No. I-1. A 2.5% by weight dimethylcyclohexane solution of the dye was used for dye film formation. This disk will hereinafter be called Disk Sample No. 3.

As in Example 3, the recording and reproduction characteristics of Disk Sample No. 5 were determined.

It was then found that the optimal recording power is 5.7 mW, with a reflectivity of at least 70%, a degree of modulation of at least 60% and an Rtop value of 69%; this was found to conform to the Orange Book standard.

Example 8

An optical recording disk was obtained following Example 3 with the exception that Dye No. II-4 was used instead of Dye No. I-1. A 2% by weight ethylcyclohexane solution of the dye was used for dye film formation. This disk will hereinafter be called Disk Sample No. 6.

As in Example 3, the recording and reproduction characteristics of Disk Sample No. 6 were determined.

It was then found that the optimal recording power is 5.4 mW, with a reflectivity of at least 70%, a degree of modulation of at least 60% and an Rtop value of 70%; this was found to conform to the Orange Book standard.

Example 9

An optical recording disk was obtained following Example 3 with the exception that Dye No. II-9 was used instead of Dye No. I-1. A 2% by weight isopropylcyclohexane solution of the dye was used for dye film formation. This disk will hereinafter be called Disk Sample No. 7.

As in Example 3, the recording and reproduction characteristics of Disk Sample No. 7 were determined.

It was then found that the optical recording power is 5.6 mW, with a reflectivity of at least 70%, a degree of modulation of at least 60% and an Rtop value of 72%; this was again found to conform to the Orange Book standard. This example indicates that the cyclohexane ring makes some contribution to sensitivity improvements.

All other dyes of formula (2) shown in Tables 1 and 2 had a solubility at 25° C. of 1 to 10% by weight in ethyl cellosolve. This indicates that by use of a dye solution using ethyl cellosolve as the coating solvent it is possible to achieve dye film formation.

Apart from the above-mentioned disk samples, various disk samples were prepared using one or two or more dyes represented by formula (2), and were then determined in terms of recording and reproduction characteristics, as mentioned above. The results were that all disk samples can be used for recording using a laser power of 4 to 8 mW, with a reflectivity of at least 70%, a degree of modulation of at least 60% and an Rtop value of at least 65%, and so conform to the Orange Book standard. Observation under an optical microscope of the nature of the dye films of the above-mentioned disk samples was made at the dye film formation stage. Consequently, it was found that all the dye films are of uniform and good-enough quality.

Comparative Example 1

An attempt was made at preparing a 4% by weight ethyl cellosolve solution of comparison dye (a), but a large part of the dye remained undissolved. Subsequently, that solution was passed through a filter having an average pore diameter of 0.2 μm to remove the undissolved dye. Subsequently, the filtrate was used following Example 3 to obtain an optical recording disk which will hereinafter be called Disk Sample (a). The thickness of the area of the recording layer within the groove was then found to be only about 100 Å.

Disk Sample (a) was found to be a substandard product in view of the similarly determined recording and reproduction characteristics.

When the above-mentioned dye solution was used without intermediary filtration, the resulting dye film was found to be of poor quality because of the precipitation of crystals therein.

Comparative Example 2

Use of comparative dye (b) again gave similar results as in Comparative Example 1.

Comparative Example 3

Use of comparative dye (c), too, gave similar results as in Comparative Example 1.

Example 10

The phthalocyanine dyes represented by formula (6) were determined in terms of melting point (mp), λmax (in toluene) and solubility (at 25° C.) in ethylcyclohexane (having a vapor pressure of 10 mmHg at 20° C. Typical results are enumerated in Tables 3 and 4.

TABLE 3

| Dye No. | λmax/nm (in toluene) | mp/° C. | Solubility (in ethyl cyclohexane)/wt % |
| --- | --- | --- | --- |
| I-1 | 705.5 | 285–290 | 4 |
| I-2 | 689.0 | 285–290 | 4 |
| I-3 | 704.0 | 270–273 | 3 |
| I-4 | 703.5 | 280–285 | 3 |
| I-5 | 687.5 | 267–270 | 3 |
| I-6 | 700.5 | 165–170 | 3 |
| I-7 | 693.0 | 225–230 | 3 |
| I-9 | 703.5 | 252–255 | 3 |
| I-10 | 705.0 | 260–265 | 3 |
| I-11 | 702.0 | 227–229 | 3 |
| I-12 | 705.0 | 272–274 | 5 |
| I-13 | 700.5 | 240–250 | 3 |
| I-14 | 684.5 | 240–245 | 3 |
| I-32 | 700.0 | 189–195 | 2.5 |
| I-33 | 718.0 | 212–214 | 2.5 |
| I-34 | 720.0 | 250–256 | 3 |
| I-35 | 705.0 | 241–243 | 3 |
| I-36 | 705.0 | 231–32 | 4.5 |
| I-37 | 697.0 | 250–257 | 4 |

TABLE 4

| Dye No. | λmax/nm (in toluene) | mp/° C. | Solubility (in ethyl cyclohexane)/wt % |
| --- | --- | --- | --- |
| V-1 | 703.5 | 123–125 | 3.5 |
| V-2 | 702.0 | 191–193 | 4 |
| V-3 | 700.0 | 154–156 | 4.5 |
| III-1 | 702.5 | 230–232 | 3 |
| III-2 | 700.5 | 225–226 | 3 |
| III-3 | 701.5 | 293–294 | 3 |
| III-4 | 700.5 | 260–265 | 3 |
| III-5 | 700.5 | 265–267 | 3 |
| II-1 | 705.5 | 231–232 | 5 |
| II-2 | 689.0 | 227–230 | 4 |
| II-3 | 704.0 | 211–215 | 3.5 |
| II-4 | 703.5 | 220–222 | 3 |
| II-5 | 687.5 | 252–257 | 3 |
| IV-1 | 702.0 | 252–254 | 3 |
| IV-2 | 700.0 | 250–255 | 3 |
| IV-3 | 701.5 | 238–241 | 3.5 |

TABLE 4-continued

| Dye No. | λmax/nm (in toluene) | mp/° C. | Solubility (in ethyl cyclohexane)/wt % |
|---|---|---|---|
| IV-4 | 700.0 | 241–242 | 3 |
| IV-5 | 700.5 | 249–251 | 3 |

For the purpose of comparison, dyes (a), (b) and (c) were determined in terms of solubility (at 25° C.) in ethylcyclohexane. As a result, their solubility was found to be virtually 0% by weight.

These results reveal that the dyes of the invention are all improved in terms of solubility, and teach that the effect on the increased solubility is due to the branched alkyl group-containing substituent present at either one of sites of the phenoxy group attached to the phthalocyanine ring via O or S.

EXAMPLE 11

Using a 3% by weight ethylcyclohexane solution of Dye No. III-1 of the exemplified dyes, a dye film was formed on a 1.2-mm thick polycarbonate substrate by spin coating. The absorption and reflection spectra of the thin-film sample were measured. The as-dried thickness of the dye film was 200 nm. The results are plotted in FIG. 3.

Figure 3:
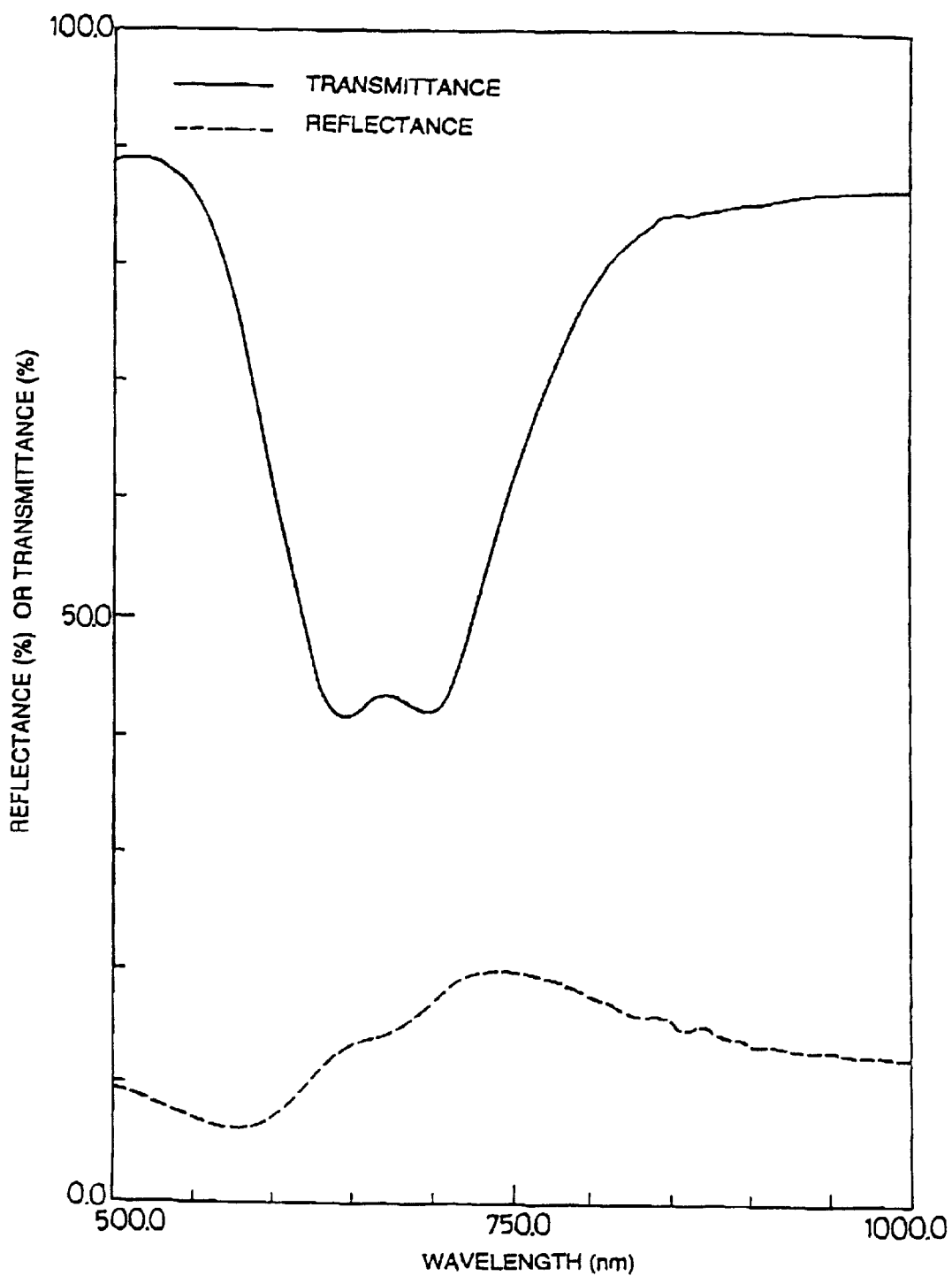
FIG. 3 is a graph showing the absorption and reflection spectra of another embodiment of the thin film of the phthalocyanine dye according to this invention.

From FIG. 3, it is found that Dye No. III-1 has a reduced absorptivity and a certain or higher reflectivity in the vicinity of the wavelength (780 nm) of semiconductor laser. In other words, this dye is found to be well fit for the recording layer of an optical recording medium with which semiconductor laser is used.

Further, the absorption and reflection spectra of Dye No. III-2 were measured. Similar results were obtained.

EXAMPLE 12

Polycarbonate was injected molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,550 Å. Using a 3% by weight ethylcyclohexane solution of Dye No. III-1, a dye film was spin coated on the resin substrate to obtain a recording layer. The as-dried thickness of the recording layer was 1,500 Å in the groove and 1,200 Å on the average. The recording layer was then formed thereon with an 85-nm thick Au reflective layer by sputtering, on which an ultraviolet-curing type of acrylic resin was formed to obtain a protective layer of 5 μm in thickness. In this way, an optical recording disk shown in FIG. 1 was obtained.

This sample will hereinafter be called Disk Sample No. 21.

Using 780-nm semiconductor laser, the recording characteristics of Disk Sample No. 21 were determined at a linear velocity of 1.4 m/s; it was found that the optimal recording power is 7.1 mW while the reflectivity, the degree of modulation and Rtop were found to be at least 70%, at least 60% and 65%, respectively. In other words, this disk is found to be an optical recording disk conforming to the Orange Book standard.

EXAMPLE 13

Disk Sample No. 22 was obtained following Example 12 with the exception that Dye No. III-2 was used instead of Dye No. III-1. Dye film formation was carried out using a 3% by weight ethylcyclohexane solution.

As in Example 12, the recording and reproduction characteristics of Disk Sample No. 22 were determined. It was then found that the optimal recording power is 6.8 mW, with a reflectivity of at least 70%, a degree of modulation of at least 60% and an Rtop value of 69%; this was found to comply with the Orange Book standard.

EXAMPLE 14

Disk Sample No. 23 was obtained following Example 12 with the exception that Dye No. IV-1 was used instead of Dye No. III-1. A 3% by weight ethylcyclohexane solution of the dye was used for dye film formation.

As in Example 12, the recording and reproduction characteristics of Disk Sample No. 23 were determined.

It was then found that the optimal recording power is 6.5 mW, with a reflectivity of at least 70%, a degree of modulation of at least 60% and an Rtop value of 70%; this was found to comply with the Orange Book standard.

All other dyes of formula (6) shown in Tables 3 and 4 had a solubility at 25° C. of 1 to 10% by weight in ethylcyclohexane. This indicates that by use of a dye solution using ethyl-cyclohexane as the coating solvent it is possible to achieve dye film formation.

EXAMPLE 15

Disk Sample No. 24 was obtained following Example 12 with the exception that Dye No. IV-2 was used instead of Dye No. III-1. A 3% by weight dimethylcyclohexane solution of the dye was used for dye film formation.

As in Example 12, the recording and reproduction characteristics of Disk Sample No. 24 were determined. It was then found that the optimal recording power is 6.7 mW, with a reflectivity of at least 70%, a degree of modulation of at least 60% and an Rtop value of 68%; this was again found to conform to the Orange Book standard.

Apart from the above-mentioned disk samples, various disk samples were prepared using one or two or more dyes represented by formula (6), and were then determined i terms of recording and reproduction characteristics, as mentioned above. The results were that all disk samples can be used for recording using a laser power of 4 to 8 mW, with a reflectivity of at least 70%, a degree of modulation of at least 60% and an Rtop value of at least 65%, and so conform to the Orange Book standard.

Observation under an optical microscope of the nature of the dye films of the above-mentioned disk samples was made at the dye film formation stage. Consequently, it was found that all the dye films are of uniform and good-enough quality.

COMPARATIVE EXAMPLE 4

An attempt was made at preparing a 3% by weight ethyl-cyclohexane solution of comparative dye (a), but a large part of the dye remained undissolved. Subsequently, that solution was passed through a filter having an average pore diameter of 0.2 μm to remove the undissolved dye. Subsequently, the filtrate was used following Example 3 to obtain an optical recording disk which will hereinafter be called Disk Sample (d). The thickness of the area of the recording layer within the groove was then found to be only about 100 Å.

Disk Sample (d) was found to be a substandard product in view of the similarly determined recording and reproduction characteristics.

When the above-mentioned dye solution was used without intermediary filtration, the resulting dye film was found to be of poor quality because of the precipitation of crystals therein.

COMPARATIVE EXAMPLE 5

Use of comparative dye (b) again gave similar results as in Comparative Example 4.

COMPARATIVE EXAMPLE 6

Use of comparative dye (c), too, gave similar results as in Comparative Example 4.

According to this invention, the phthalocyanine dye—which can be synthesized in a relatively ready manner and can be well soluble in an easy-to-handle alcoholic solvent (e.g., ethyl cellosolve) or aliphatic hydrocarbon solvent—can be used to form a dye film of sufficient thickness and excellent quality. By application of this dye film to a recording layer it is thus possible to obtain an optical recording disk conforming to the CD standard.

Japanese Patent Application No. 6-87864 is incorporated herein by reference as well as the above-cited patent publications.

Although numerous preferred embodiments have been described, many other modifications and variations may be made thereto in the light of the above teachings. It is therefore to be understood that within the scope of the appended claims, the invention may be practiced otherwise than as specifically described.

We claim:

1. A phthalocyanine dye having at least one group represented by the following general formula:

wherein:

Y is an atom attached to the phthalocyanine ring and stands for an oxygen or sulphur atom, Z is the group of atoms required to complete a carbon or heterocyclic ring together with a carbon atom, $A_1$ is a monovalent substituent bulkier than a hydrogen atom, and each of $X_1$ and $X_2$ is a hydrogen atom or a monovalent substituent or, in the alternative, $X_1$ and $X_2$, taken together, form a single bond.

2. The phthalocyanine dye of claim 1, wherein said phthalocyanine dye is represented by the following formula:

wherein:

M is a center atom of the phthalocyanine ring,

Y is an oxygen or sulphur atom,

Z is the group of atoms required to complete a carbon or heterocyclic ring together with a carbon atom, $A_1$ is a monovalent substituent bulkier than a hydrogen atom, $A_2$ is a hydrogen atom or monovalent substituent represented by $A_1$, each of $X_1$ and $X_2$ is a hydrogen atom or monovalent substituent or, in the alternative, $X_1$ and $X_2$, taken together, form a single bond, q1 is an integer of 1 to 4, each of q2, q3 and q4 is 0 or an integer of 1 to 4, R is a monovalent substituent, and each of r1, r2, r3 and r4 is 0 or an integer of 1 to 4.

3. The phthalocyanine dye of claim 2, wherein said phthalocyanine dye is represented by the following general formula:

wherein:

M is a center atom of the phthalocyanine ring,

Y is an oxygen or sulphur atom, $A_3$ is a monovalent substituent bulkier than a hydrogen atom, r is 0 or an integer of 1 to 3, $R_0$ is 0 or an integer of 1 to 3, and each of $R_1$, $R_2$, $R_3$ and $R_4$ is a monovalent substituent.

4. The phthalocyanine dye of claim 3, wherein at least one of $R_1$, $R_2$, $R_3$ and $R_4$ is a monovalent substituent.

5. The phthalocyanine dye of claim 1, wherein said phthalocyanine dye has one to eight groups represented by said general formula per molecule.

6. The phthalocyanine dye of claim 5, wherein said phthalocyanine dye has four groups represented by said general formula per molecule.

7. The phthalocyanine dye of claim 1, wherein said center atom of the phthalocyanine ring is Cu, Pd, or Ni.

8. The phthalocyanine dye of claim 1, wherein said Y is an oxygen atom.

9. The phthalocyanine dye of claim 1, wherein the solubility of said phthalocyanine dye in ethylene glycol, monoethyl ether or ethyl cellosolve is 1% by weight to 10% by weight at 25 degrees C.

10. A phthalocyanine dye having at least one group represented by the following general formula:

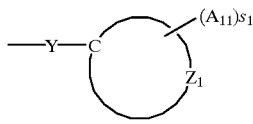

wherein:

Y is an oxygen or sulphur atom, $Z_1$ is the group of atoms required to complete a carbon or heterocyclic ring together with a carbon atom, $A_{11}$ is a monovalent substituent having a branched alkyl group, which is attached to the ring completed by Z1, s1 stands for the number of $A_{11}$ with s1 being an integer of at least 1.

11. The phthalocyanine dye of claim 10, wherein said phthalocyaniine dye is represented by the following general formula:

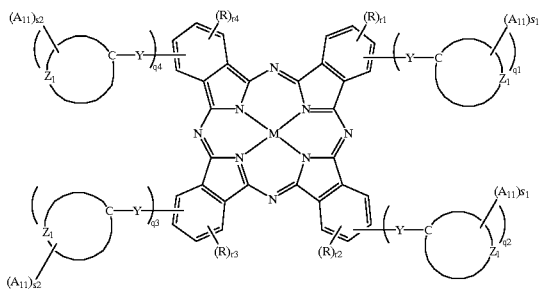

wherein:

M is a center atom of the phthalocyanine ring,

Y is an oxygen or sulphur atom, $Z_1$ is the group of atoms required to complete a carbon or heterocyclic ring together with a carbon atom, $A_{11}$ is a monovalent substituent having a branched alkyl group, which is attached to the ring completed by Z1, each of q2, q3 and q4 is 0 or an integer of 1 to 4, R is a monovalent substituent, and each of r1, r2, r3 and r4 is 0 or an integer of 1 to 4.

12. The phthalocyanine dye of claim 11, wherein said phthalocyanine dye is represented by the following general formula:

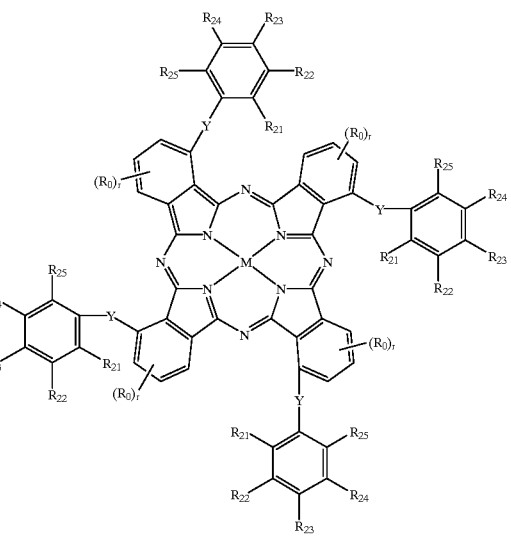

wherein:

M is a center atom of the phthalocyanine ring,

Y is an oxygen or sulphur atom, each of $R_{21}$, $R_{22}$, $R_{23}$, $R_{24}$, and $R_{25}$ is a hydrogen atom or a monovalent substituent with at least one of $R_{21-25}$ being a monovalent substituent having a branched alkyl group, $R_0$ is a monovalent substituent, and r is 0 or an integer of 1 to 3.

13. The phthalocyanine dye of claim 12, wherein at least one of $R_{21}$, $R_{22}$, $R_{23}$, $R_{24}$, and $R_{25}$ is a monovalent substituent having a branched alkyl group.

14. The phthalocyanine dye of claim 11, wherein said phthalocyanine dye is represented by the following general formula:

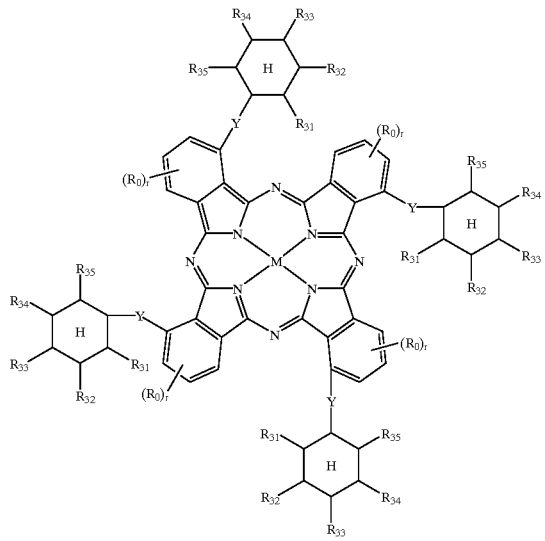

wherein:

M is a center atom of the phthalocyanine ring,

Y is an oxygen or sulphur atom, each of $R_{31}$, $R_{32}$, $R_{33}$, $R_{34}$, and $R_{35}$ is a hydrogen atom or a monovalent substituent with at least one of $R_{31-35}$ being a monovalent substituent having a branched alkyl group, $R_0$ is a monovalent substituent, and r is 0 or an integer of 1 to 3.

15. The phthalocyanine dye of claim 14, wherein at least one of said $R_{31}, R_{32}, R_{33}, R_{34}, R_{35}$ is a monovalent substituent having a branched alkyl group.

16. The phthalocyanine dye of claim 10, wherein the phthalocyanine dye has one to eight groups represented by said general formula (5) per molecule.

17. The phthalocyanine dye of claim 16, wherein said phthalocyanine dye has four groups represented by said general formula (5) per molecule.

18. The phthalocyanine dye of claim 10, wherein the ring completed by said $Z_1$ is an aromatic or aliphatic carbon ring.

19. The phthalocyanine dye of claim 18, wherein said carbon ring is a benzene or cyclohexane ring.

20. The phthalocyanine dye of claim 10, wherein said monovalent substituent having a branched alkyl group is an alkyl group, an alkoxy group, an alkythio group or an amino group.

21. The phthalocyanine dye of claim 20, wherein said monovalent substituent having a branched alkyl group is an alkyl group.

22. The phthalocyanine dye of claim 10, wherein said center atom of the phthalocyanine ring is Cu, Pd or Ni.

23. The phthalocyanine dye of claim 10, wherein said Y is an oxygen atom.

24. The phthalocyanine dye of claim 10, wherein the solubility of said phthalocyanine dye in ethylcyclohexane is 0.5% by weight to 10% by weight at 25 degrees C.

25. A phthalocyanine dye having at last one group represented by the following general formula:

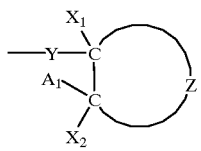

wherein:

Y is an atom attached to the phthalocyanine ring and represents an oxygen or sulphur atom, Z is the group of atoms required to complete a cycloxane ring together with a carbon atom, $A_1$ is a monovalent substituent bulkier than a hydrogen atom, and each of $X_1$ and $X_2$ is a hydrogen atom or a monovalent substituent or, in the alternative, $X_1$ and $X_2$, taken together, form a single bond.

26. The phthalocyanine dye of claim 25, wherein said phthalocyanine dye is represented by the following general formula:

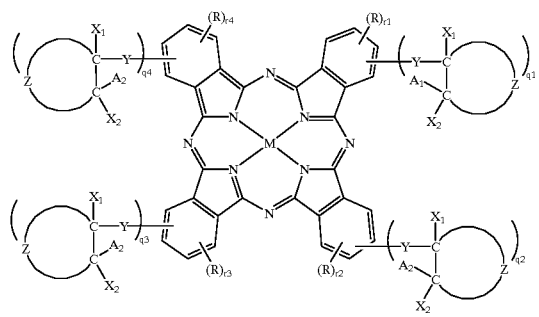

wherein:

M is a center atom of the phthalocyanine ring,

Y is an oxygen or sulphur atom,

Z is the group of atoms required to complete a cyclohexane ring together with a carbon atom, $A_1$ is a monovalent substituent bulkier than a hydrogen atom, $A_2$ is a hydrogen atom or a monovalent substituent bulkier than a hydrogen atom, each of $X_1$ and $X_2$ is a hydrogen atom or a monovalent substituent or, in the alternative, $X_1$ and $X_2$ is a hydrogen atom or a monovalent substituent or, in the alternative, $X_1$ and $X_2$, taken together, form a single bond, q1 is an integer of 1 to 4, each of q2, q3 and q4 is 0 or an integer of 1 to 4, R is a monovalent substituent, and each of r1, r2, r3 and r4 is 0 or an integer of 1 to 4.

27. The phthalocyanine dye of claim 25, wherein said phthalocyanine dye has one to eight groups represented by said general formula per molecule.

28. The phthalocyanine dye of claim 27, wherein said phthalocyanine dye has four groups represented by said general formula per molecule.

29. The phthalocyanine dye of claim 28, wherein said monovalent substituent bulkier than a hydrogen atom is selected from the group consisting of a halogen atom, an alkyl, aryl, alkoxy, aryloxy, aralkyl, nitro, carboxyl, ester, acyl, amino, amido, carbamoyl, sulfonyl, sulfamoyl, sulfo, sulfino, arlazo, alkythio and arylthio groups.

30. The phthalocyanine dye of claim 29, wherein said monovalent substituent bulkier than a hydrogen atom is selected from the group consisting of alyl, aryl, alkoxy, aryloxy, aralkyl, ester, amino, amido, carbamoyl, sulfonyl or a sulfamoyl group having and alkyl or aryl group.

31. The phthalocyanine dye of claim 30, wherein said monovalent bulkier than a hydrogen atom is a branched alkyl or an alkoxy, ester, acyl, amino, amido, carbamoyl, sulfamoyl or alkylthio group having a branched alkyl group.

32. The phthalocyanine dye of claim 31, wherein said monovalent substituent bulkier than a hydrogen atom is a branched alkyl group.

33. The phthalocyanine dye of claim 25, wherein said y is an oxygen atom.

34. The phthalocyanine dye of claim 25, wherein the solubility of said phthalocyanine dye is ethylene glycol monoethyl ether or ethyl cellosolve is 1% by weight to 10% by weight at 25 degrees C.

35. The phthalocyanine dye is represented by the following general formula:

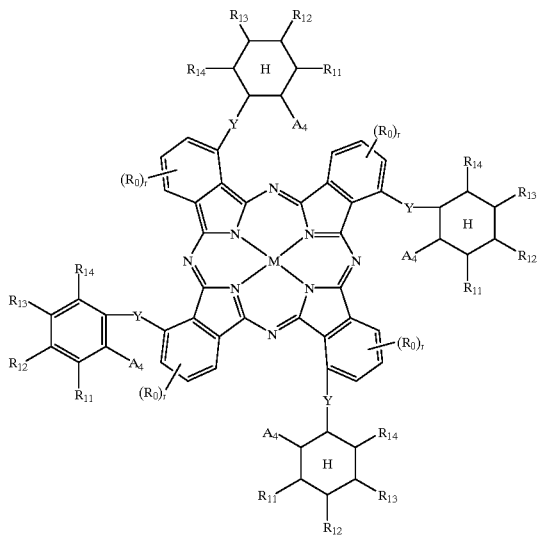

wherein:

M is a center atom of the phthalocyanine ring,

Y is an oxygen or sulphur atom, $A_4$ is a monovalent substituent bulkier than a hydrogen atom, $R_0$ is a monovalent substituent, r is 0 or an integer of 1 to 3, and each of $R_{11}$, $R_{12}$, $R_{13}$ and $R_{14}$ is a hydrogen atom or a monovalent substituent.

36. The phthalocyanine dye of claim 35, wherein at least one of said $R_{11}$, $R_{12}$, $R_{13}$ and $R_{14}$ is a monovalent substituent.

37. A phthalocyanine dye having at least one group represented by the following general formula:

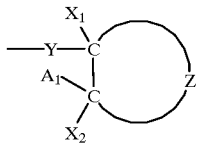

wherein:

Y is an atom attached to the phthalocyanine ring and stands for an oxygen or sulphur atom, Z is the group of atoms required to complete a carbon or heterocyclic ring together with a carbon atom, $A_1$ is a monovalent substituent bulkier than a hydrogen atom and is selected from the group consisting of a halogen atom, and alkyl, aryl, alkoxy, aralkyl, nitro, carboxyl, ester, arylazo, alkylthio and arylthio groups or an acyl, amino, amido, carbamoyl, sulfonyl or sulfamoyl group having an alkyl or aryl group, and each of $X_1$ and $X_2$ is a hydrogen atom or a monovalent substituent or, in the alternative, $X_1$ and $X_2$, taken together, form a single bond.

38. The phthalocyanine dye of claim 37, wherein said monovalent substituent bulkier than a hydrogen atom is a branched alkyl or an alkoxy, ester, acyl, amino, amido, carbamoyl, sulfonyl, sulfamoyl or alkylthio group having a branched alkyl group.

39. The phthalocyanine dye of claim 1, wherein said monovalent substituent bulkier than a hydrogen atom is a branched alkyl group.

* * * * *

UNITED STATES PATENT AND TRADEMARK OFFICE
CERTIFICATE OF CORRECTION

PATENT NO. : 6,017,604
DATED : 25 January 2000
INVENTOR(S) : Sumiko Kitagawa et al.

It is certified that error appears in the above-identified patent and that said Letters Patent is hereby corrected as shown below:

Column 81, line 46 in the second row, right hand side of the formula, "$(A_{11}) S_1$" should read -- $(A_{11})S_2$ --

Column 83, line 5, "$R_{34}R_{35}$" should read -- $R_{34}$ and $R_{35}$ --

Column 84, line 49, delete "alyl" and insert --alkyl--

Column 86, line 34, delete "1" and insert --38--

Signed and Sealed this

Twentieth Day of February, 2001

*Attest:*

NICHOLAS P. GODICI

*Attesting Officer*   Acting Director of the United States Patent and Trademark Office